Jan. 4, 1949.  O. S. FIELD ET AL  2,458,361
AIRWAY TRAFFIC CONTROL SYSTEM
Filed July 29, 1944  9 Sheets-Sheet 1
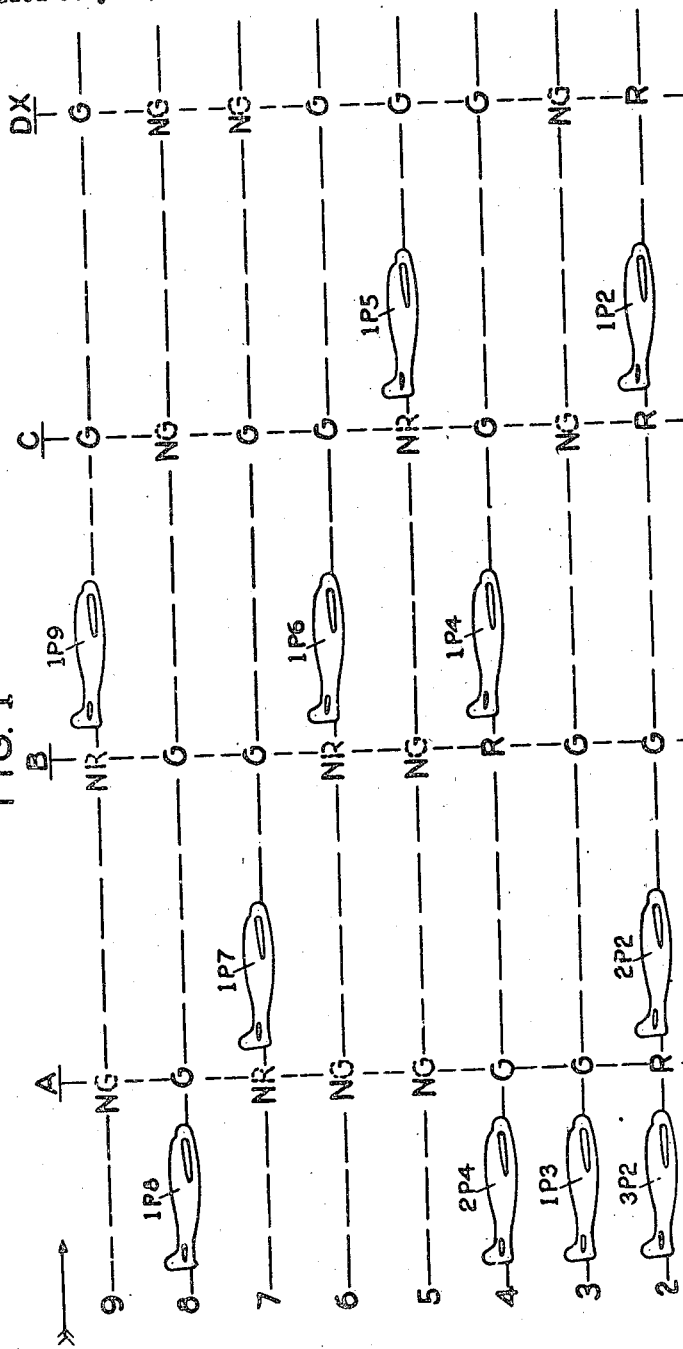
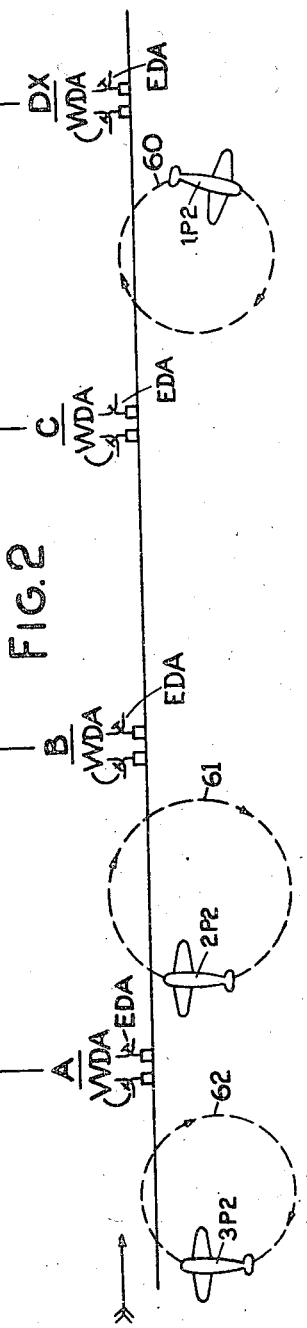
Inventors
O. S. Field and S. N. Wight
By Neil W. Preston,
Their Attorney

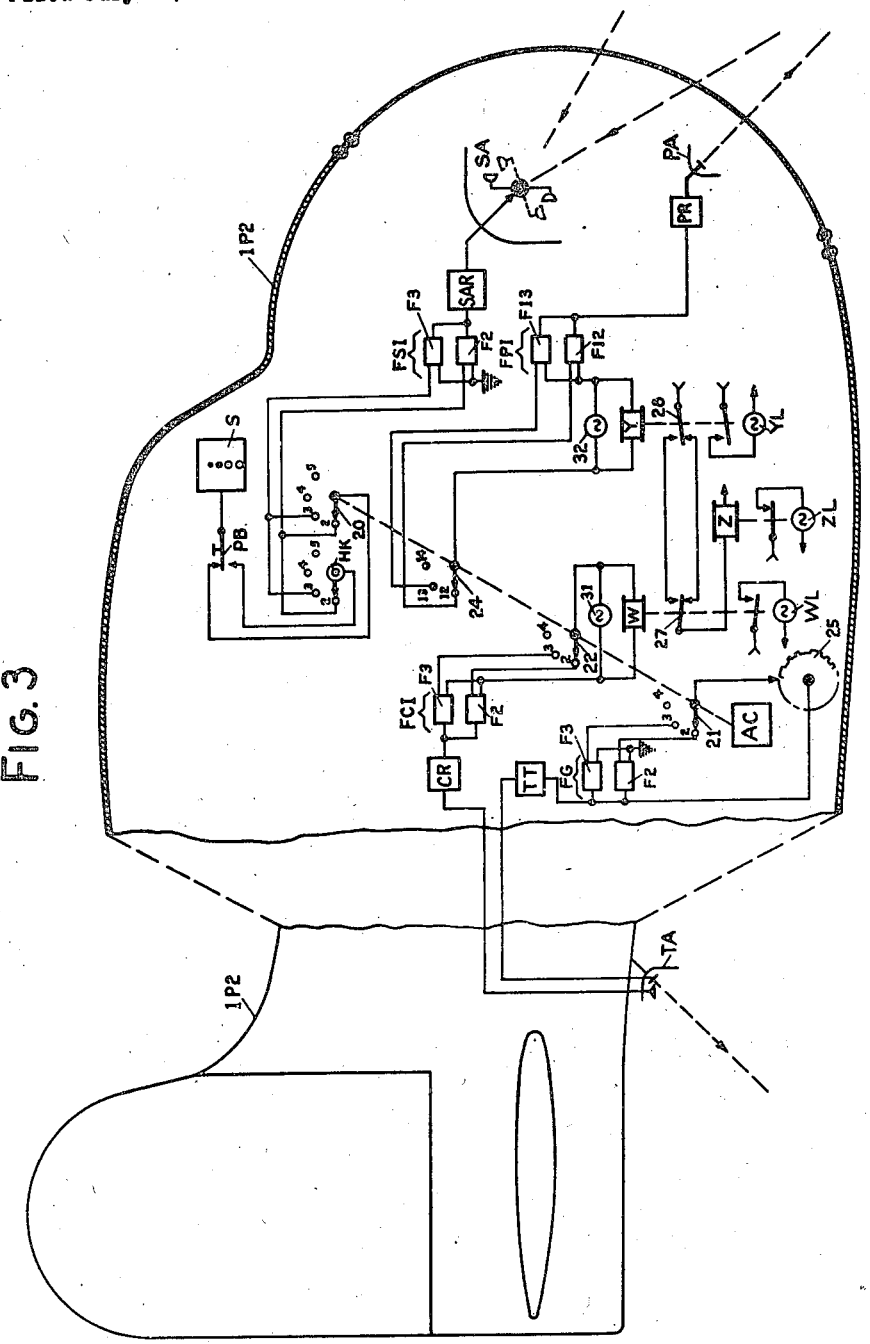

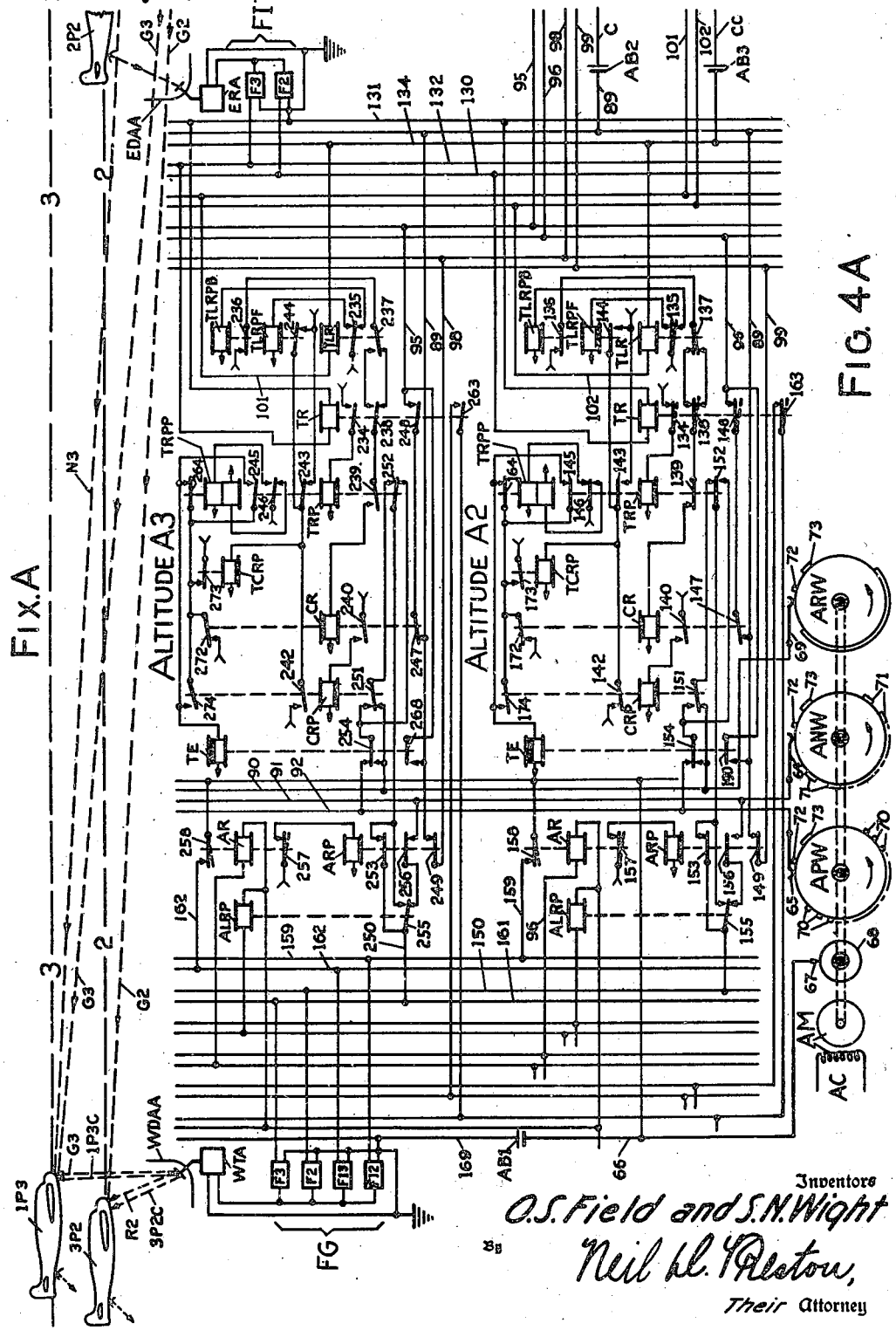

Jan. 4, 1949.   O. S. FIELD ET AL   2,458,361
AIRWAY TRAFFIC CONTROL SYSTEM
Filed July 29, 1944   9 Sheets-Sheet 4
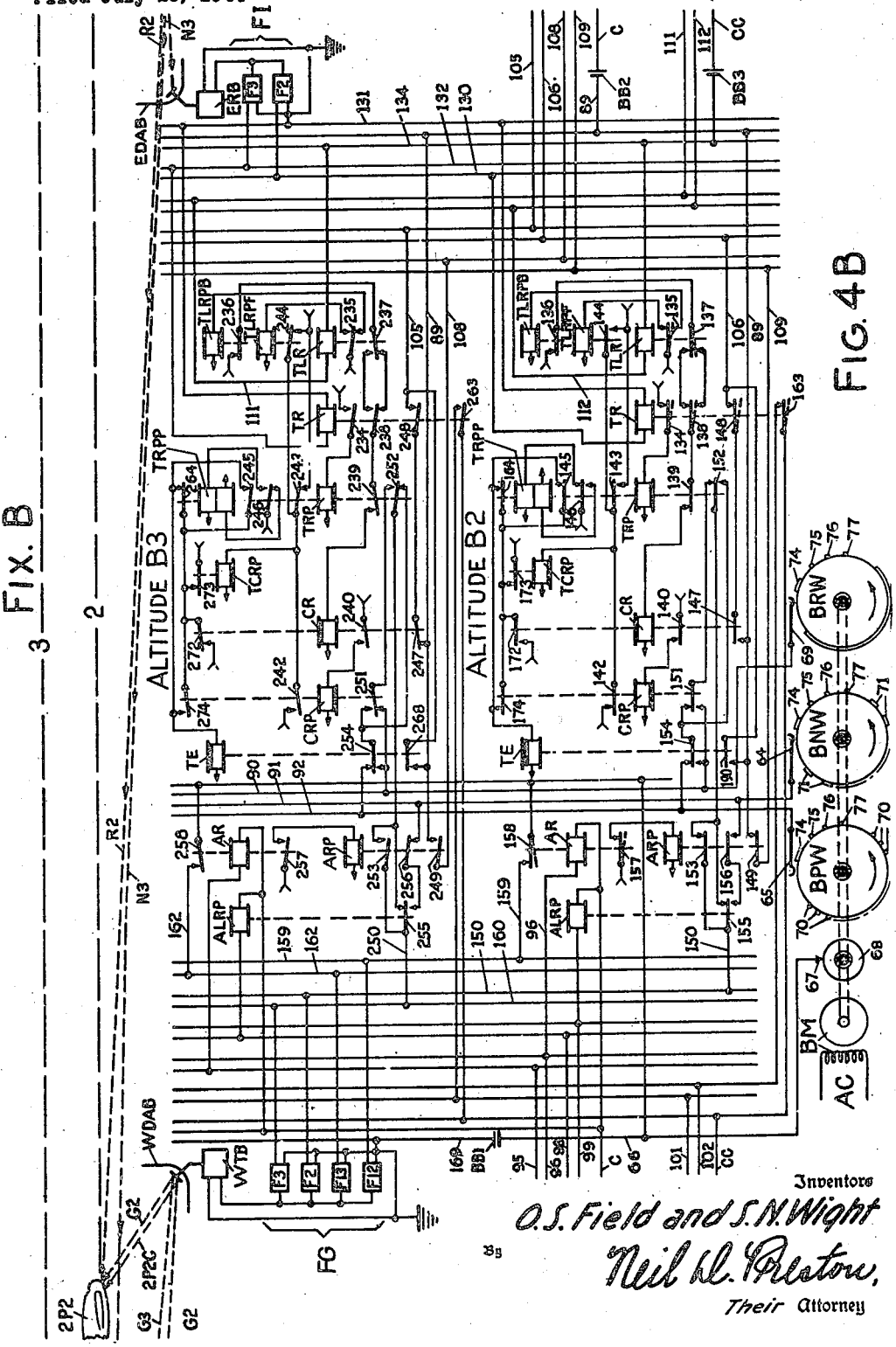
Inventors
O. S. Field and S. N. Wight
Neil A. Preston,
Their Attorney

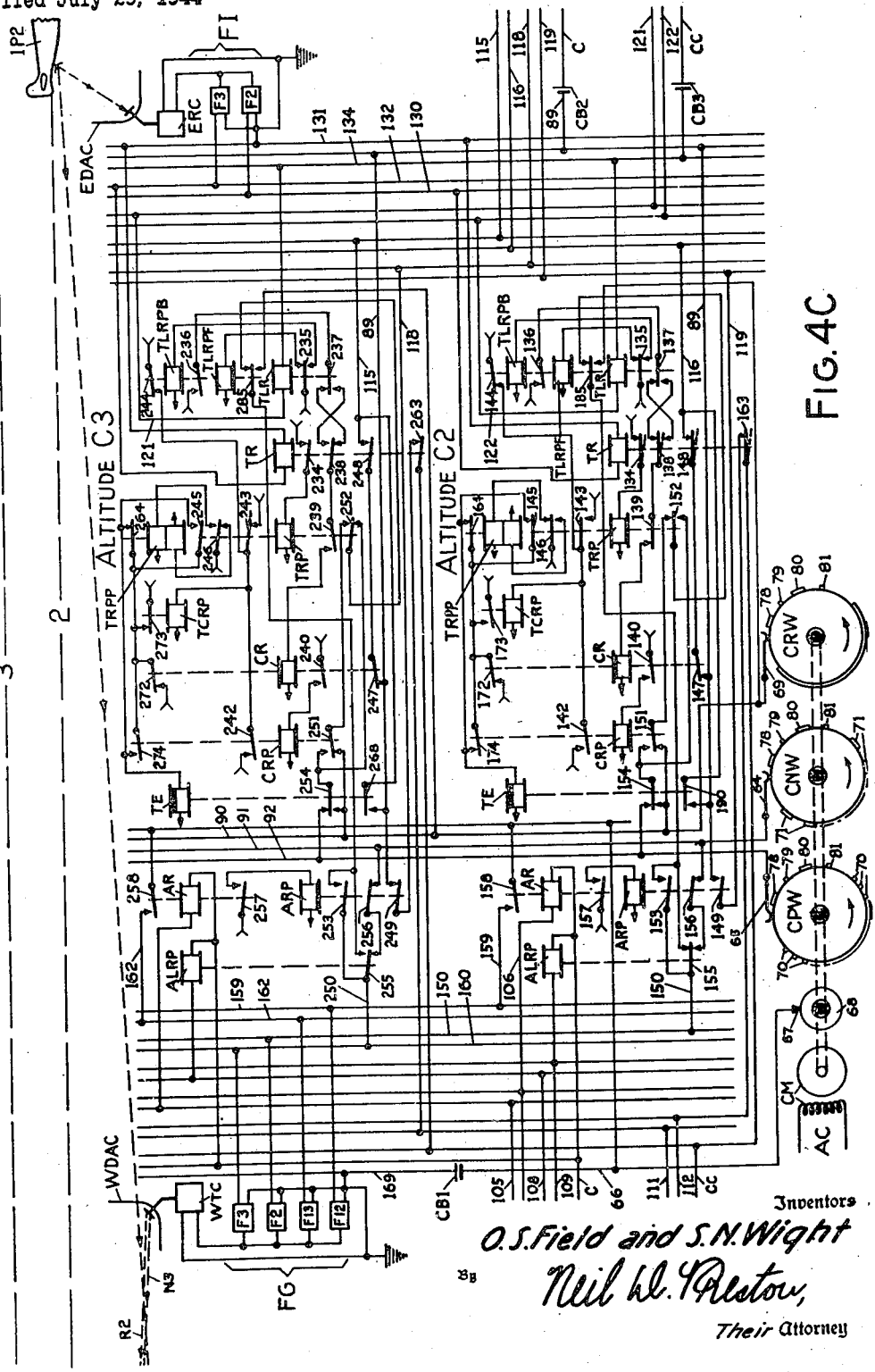

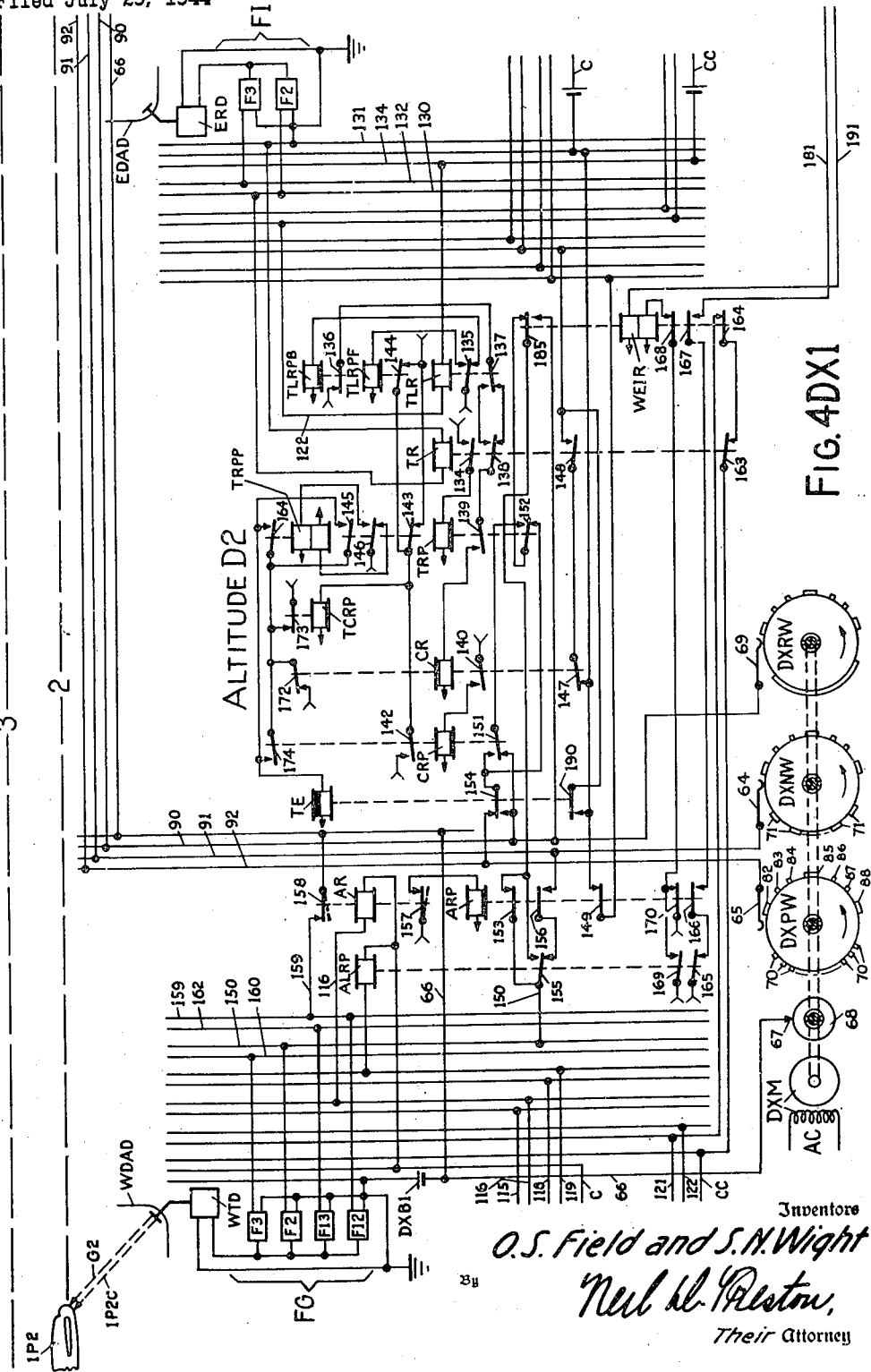
Fig. 4DX1

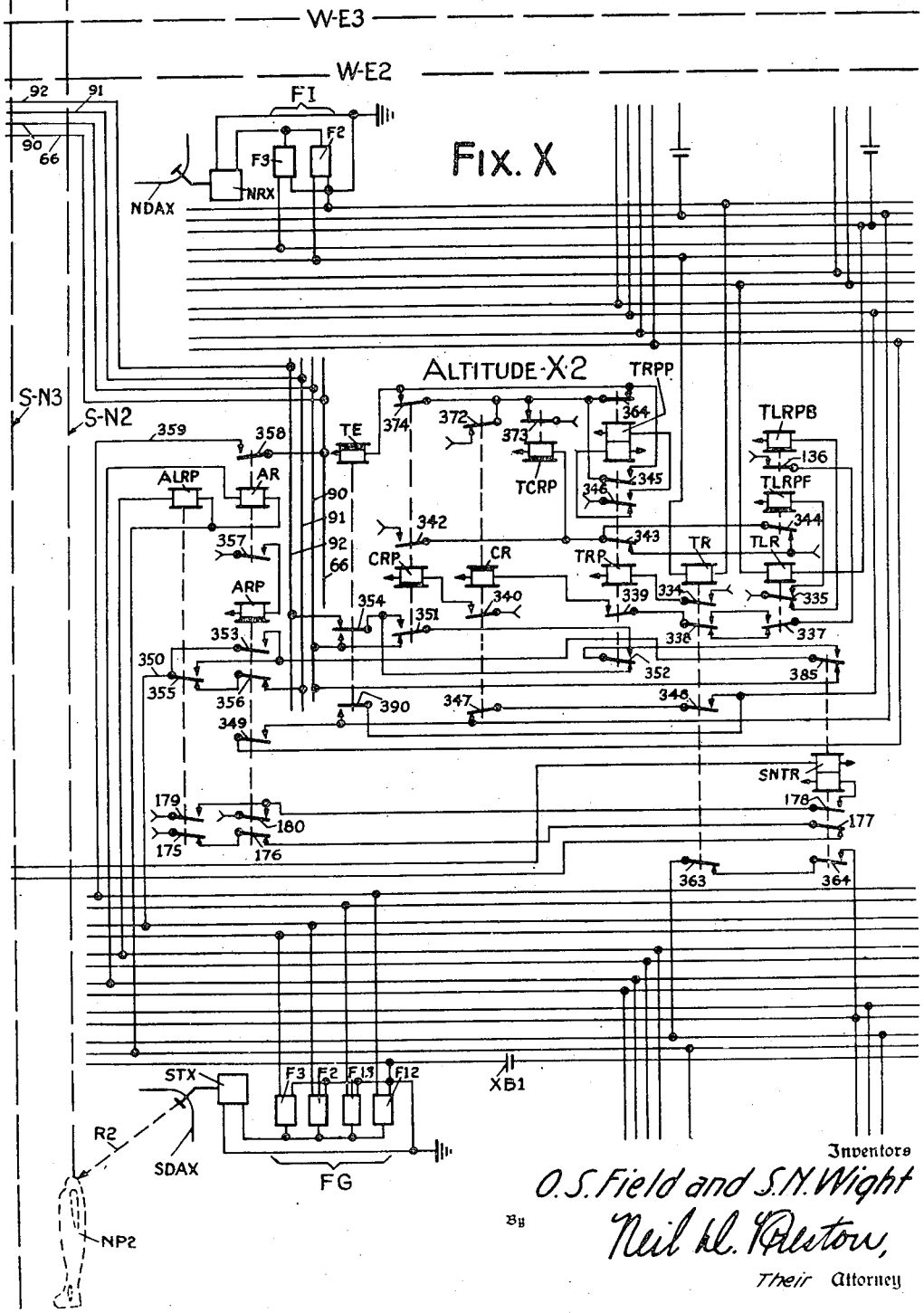

Jan. 4, 1949.　　　　O. S. FIELD ET AL　　　　2,458,361
AIRWAY TRAFFIC CONTROL SYSTEM

Filed July 29, 1944　　　　　　　　　　　　　　9 Sheets—Sheet 8

Inventors
O. S. Field and S. N. Wight
Neil W. Alston,
Their Attorney

Inventors
O. S. Field and S. N. Wight
By Neil W. Alston,
Their Attorney

Patented Jan. 4, 1949

2,458,361

UNITED STATES PATENT OFFICE 2,458,361

AIRWAY TRAFFIC CONTROL SYSTEM

Oscar S. Field and Sedgwick N. Wight, Rochester, N. Y., assignors to General Railway Signal Company, Rochester, N. Y.

Application July 29, 1944, Serial No. 547,175

53 Claims. (Cl. 343—112)

This invention relates to a combined airway traffic route defining and airway traffic condition signalling system, and more particularly to such a system in which airway traffic conditions in advance are indicated in the cab of an airplane automatically irrespective of weather and fog conditions. This invention is to be considered as an improvement over the prior applications of Wight, Field and Saint, Ser. No. 517,814, filed January 11, 1944, and Dicke, Ser. No. 532,181, filed April 21, 1944, which issued April 20, 1948 as Patent No. 2,439,846, which disclose only airway route defining apparatuses.

A number of difficult and important problems present themselves in the dispatching of large numbers of airplanes over specific air routes irrespective of the presence of fog and clouds, and more particularly when vision is very poor due to such atmospheric condition. The first of these problems is due to the possibility of having too many airplanes arrive at their destination airport at the same time and the solution of this problem resides in the provision of means for starting out these airplanes at their starting points at the proper times to prevent such congestion, and the second problem, namely, the problem of the present application, is not concerned with this first problem in that it is limited to apparatus for governing the progress of airplanes over particular routes and to the crossing of other routes by such airplanes.

This second problem resides in the proper spacing of airplanes flying in a particular direction over a route irrespective of weather and fog conditions and in providing proper means whereby airplanes flying on two routes crossing each other will not cross at the same altitude at the same time.

In accordance with the present invention it is proposed to employ radio communicating facilities to distinctively manifest at successive fixes or stations along the route the presence of airplanes in the various altitude layers over such route and between that fix and the next fix in advance, and in the provision of radio communicating means for retransmitting such information of occupancy from such fix to approaching airplanes in the rear.

One of the objects of the present invention is to provide each wayside station or fix with a single radio receiving antenna and a single radio transmitting antenna, both of which are preferably directional, and which may receive and transmit, respectively, radio energy which is distinctive of traffic conditions in advance for each of the various altitudes and in the provision of airplane carried radio receiving means which normally responds only to radio energy characteristic of airway traffic in advance of the airplane in the particular altitude at which such airplane is flying.

Another object of the present invention resides in the provision of a scanning radio receiving antenna and an associated kinescope which pictorially indicates to the pilot irrespective of weather or fog conditions the locations of one or more ground radio transmitting stations in advance of the airplane on the route. It should be understood that normally these pictorially indicated radio transmitting antennae would emit coded energy which would cause the spot on the kinescope identifying such ground radio transmitting station to flash in code to not only indicate traffic conditions in advance for that altitude but which will also be coded or otherwise characterized to identify the particular way station at which such transmitting antenna is located.

Another object of the present invention resides in the provision of manually operable selecting means whereby the radio receiving apparatus including the scanning antenna and kinescope above mentioned, may render this receiving apparatus no longer responsive to the radio energy characteristic of the altitude at which the airplane is flying but will receive energy assigned only to some other altitude as for instance the next adjacent altitude above or the next adjacent altitude below the altitude at which such airplane is flying, so that the pilot may at will by manual operation of such manually operable selecting means observe traffic conditions in such other and adjacent altitude. It is of course understood that such looking, so to speak, into another altitude would ordinarily be confined to the next adjacent altitude either above or below the altitude at which the airplane is flying but the proposed apparatus is not restricted to such limited use. This feature of applicants' invention enables a pilot to ascend to the next adjacent higher altitude or to descend to the next adjacent lower altitude in the event the section directly in advance of him, at the altitude at which he is flying, is occupied by another airplane having a considerably lower cruising speed than the airplane which he is piloting.

Another object of the present invention resides in the provision of means on an airplane for transmitting a rearwardly directed radio beam to the ground stations or fixes in the rear so as to manifest its presence in an airplane in the second section or the section next in the rear at the same altitude. This emitted radio beam will of course be characteristic of the altitude at which the airplane is flying and will cause the ground station next in the rear of the airplane to emit radio energy characteristic of such traffic conditions and also characteristic of the altitude at which the airplane responsible for such transmitted energy is flying.

Another object of the present invention resides in the provision of means to characterize the radio energy rearwardly emitted from an airplane so as to identify that particular airplane, provision being made on the ground for repeating such airplane identifying characteristic to the next ground station or fix in advance and to cause the enerby transmitted from such ground station next in advance back to the same airplane where it originated, so as to identify that airplane. The net result of this repeating of the airplane identifying code is the airplane may observe and check the operativeness of its sending apparatus and also the operativeness of the ground radio receiving apparatus in the rear and the ground radio transmitting apparatus directly in advance of the airplane in flight. This checking provision should provide the necessary check against failure of apparatus relied upon to indicate dangerous traffic conditions in advance of an airplane.

Another object of the present invention resides in the provision of means for operating contact mechanism for manifesting the altitude at which an airplane is flying. This contact mechanism is to manifest such altitude in conformity with the indication given by a rather delicately designed altimeter. In accordance with this object of the present invention it is proposed to employ a light beam which swings through an arc in accordance with the swinging of an indicating point in an altimeter and in the provision of means for operating contacts to a position corresponding to the position assumed by such light beam through the medium of a selenium cell, photo-electric cell or other suitable light responsive apparatus.

Another object of the present invention resides in the provision of automatically controlled interlocking means at a common fix or station where two airway routes cross each other at the same altitudes and including means for displaying a stop or hold indication for a particular altitude on one route when there is an airplane approaching at that altitude on the other route, whereby the crossing point of the two routes for a particular altitude may be alloted to that airplane which first approaches the common fix or station.

Other objects, purposes and characteristic features of the present invention will in part be described hereinafter and will in part be obvious from the accompanying drawings, in which:

Fig. 1 illustrates various airplanes flying at various altitudes over an eastbound route defined by fixes or stations A, B, C and D;

Fig. 2 indicates a plan view of the airway route shown in Fig. 1 and illustrates how an airplane may loop sidewise in the event the section in advance is occupied as a result of which he must hold, so to speak, to avoid flying into an occupied section;

Fig. 3 illustrates conventionally an airplane equipped with airplane carrying apparatus embodying the present invention;

Figs. 4A–4C illustrate the ground located apparatus of an eastbound route embodying the present invention;

Figure 5A:
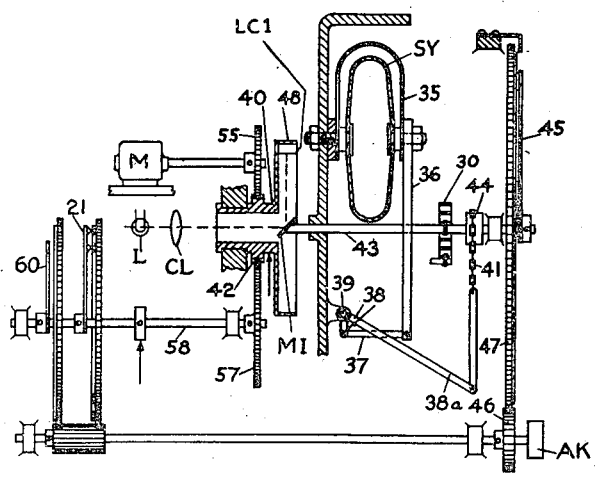
Figure 5C:
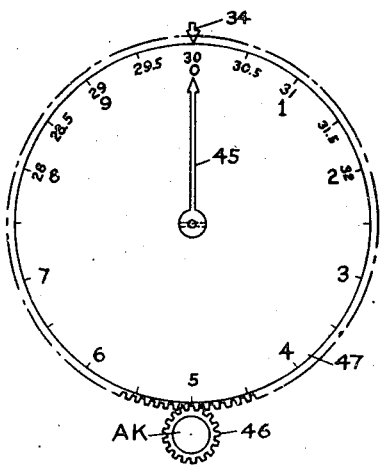
Figure 5B:
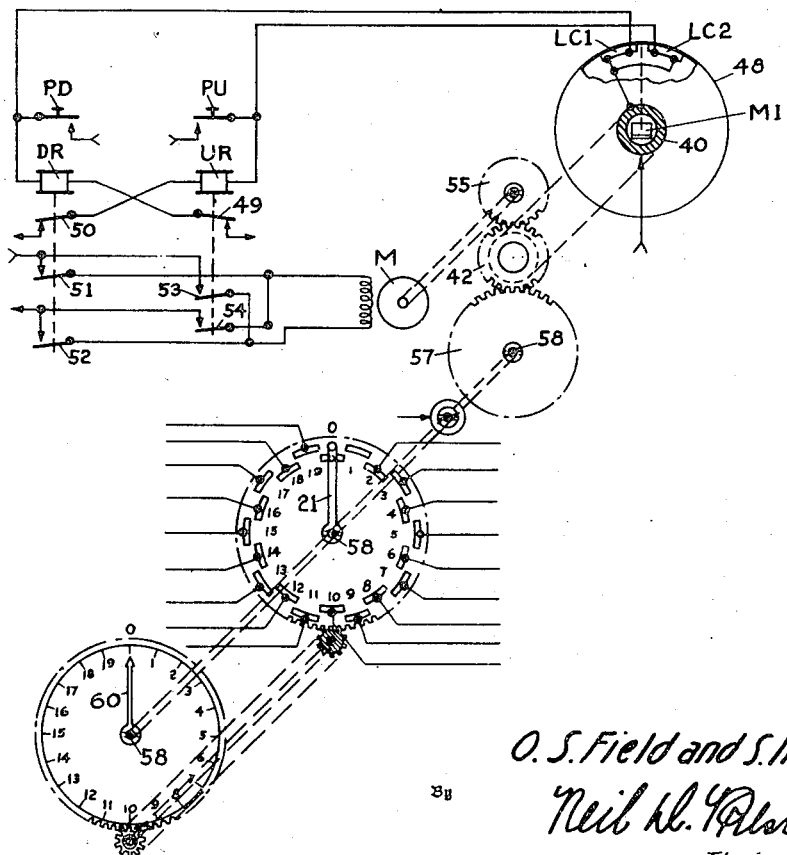
Figure 6:
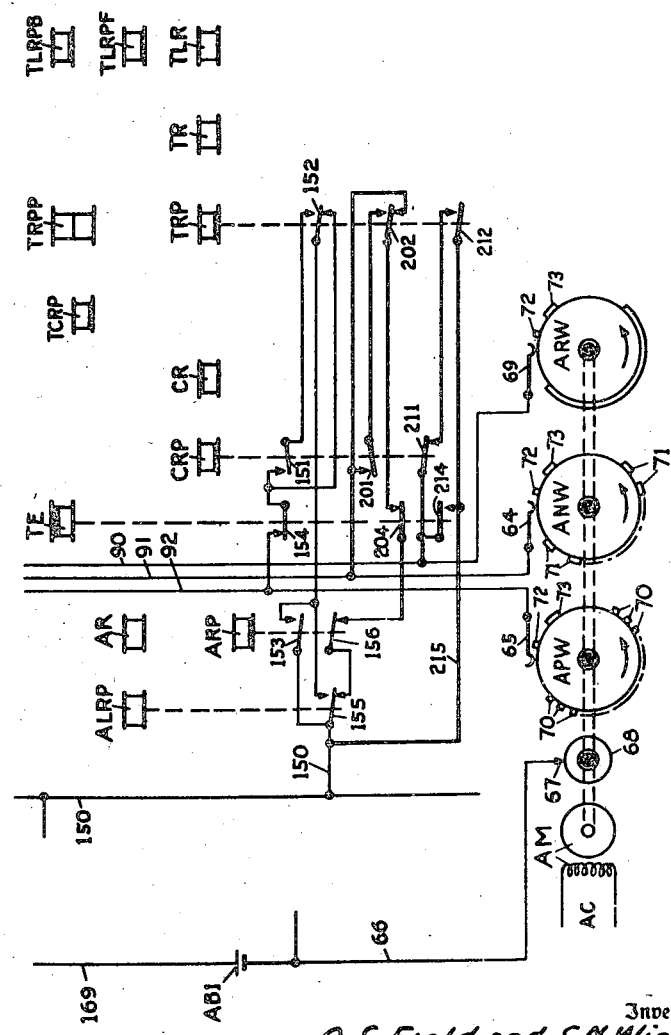

Figs. 4DX1 and 4DX2 illustrate automatic interlocking apparatus for a common fix at an airway crossing;

Figs. 5A, 5B and 5C illustrate an altimeter controlled contact mechanism constituting part of the airplane carried mechanism illustrated in Fig. 3; and Fig. 6 illustrates a modified form of the ground located apparatus shown in Figs. 4A–4DX which operates to give a distinctive hold indication under certain conditions of failure of the approach control apparatus.

General discussion

In order to obtain a better understanding of the manner in which the apparatus of the present invention is to be used attention is directed to Figs 1 and 2 of the drawings.

In Fig. 1 has been illustrated a portion of an air-route including way stations or fixes A, B, C and DX for altitudes from 2000 feet to 9000 feet, inclusive. In altitude 2 have been illustrated airplanes 1P2, 2P2 and 3P2; in altitude 3 has been illustrated airplane 1P3. These airplanes are also shown in Figs. 4A–4C. In altitude 4 have been illustrated airplanes 1P4 and 2P4; and in altitudes 5, 6, 7, 8 and 9 have been illustrated airplanes 1P5, 1P6, 1P7, 1P8 and 1P9 respectively.

Although, as will be, more fully pointed out hereinafter, fix A, B, C or DX is each provided with only a single radiating or sending antenna and this radiating antenna in accordance with the particular invention illustrated radiates only a single carrier frequency to airplanes in the rear, this carrier frequency is preferably modulated at a plurality of frequencies, one modulating frequency for each altitude, so that the pilot in a particular airplane will observe on the screen S (Fig. 3) of the kinescope carried by his airplane traffic conditions for his altitude only for particular ground stations, whereas other airplanes flying at different altitudes will distinctively be informed as to traffic conditions in advance for their altitudes from the same emitted beam which emits distinctive radio energy to airplanes for all altitudes. It should, however, be understood that a separate carrier frequency may be used for each altitude for each direction of transmission to and from airplanes. By reason of the extremely high frequency radio carrier frequency proposed to be used (ultra-high frequency) the modulating frequencies may also be very high and would in practice be high enough so as to be inaudible. This inaudibility is desirable in order to be able to properly discern the code superimposed on the modulating frequency.

This characteristic feature of applicants' invention is clearly exemplified by the various indications given for the various altitudes 2 to 9 for fix B, for instance, in Fig. 1 of the drawings. It may be pointed out that the solid letters G and R signify proceed and hold traffic conditions in advance whereas dotted letters G and R when accompanied with the solid letter N signify that normal traffic conditions are manifested for that altitude whereas the associated dotted letter G (see fix B altitude 5000) will manifest that the traffic condition for this altitude and fix is potentially proceed. This proceed indication is not normally given because no approach control for that fix and altitude has been rendered effective. Similarly, a dotted letter R with a solid letter N (see fix B altitude 6000) denotes that the particular altitude is potentially a holding fix altitude and that the radio energy transmitted for that altitude and fix manifests normal traffic conditions. The pilot of an airplane flying that altitude but to the rear of a fix will of course observe an R signal only (not the N) due to approach control that his airplane exercises, whereas if there is no such approaching airplane in that altitude and a pilot from an airplane in another altitude sets his hand knob HK (Fig. 3) to look for traffic conditions in the first mentioned altitude will observe traffic condition N. For instance, the traffic manifestation for altitude 8, fix C, is N followed by a dotted letter G which signifies that traffic conditions are potentially clear but that the airplane IP8, which has exercised approach control over fixes A and B, has not yet exercised approach control over fix C. Indication G for altitude 7 at fix C indicates that the approach control imposed by airplane IP7 extends far enough to have changed the traffic manifestation from normal (N) to proceed (G). Similarly, the traffic manifestation for altitude 6, fix B, is N followed by a dotted letter R which signifies that traffic condition for this fix altitude is potentially danger, meaning hold, and that no airplane is approaching from the rear at close enough range to exercise its approach control over fix B.

Referring now to Fig. 2 of the drawings the dotted circle or loop 60 illustrates the path over which the airplane IP2 may circle to effect a holding operation. That is, in accordance with the present invention an airplane is not allowed to pass a fix manifesting danger, that is manifesting hold traffic conditions, and if an airplane is approaching such fix he must hold by a circling operation until traffic conditions in advance clear up and manifest proceed. Similar circling loops 61 and 62 have been illustrated for airplanes 2P2 and 3P2 respectively. Airplane 2P2 is not required to hold but may hold on his own volition. The manner in which a ground radio station maintains a danger signal aspect (R) while an airplane is circling in its holding circle in the block in advance is more specifically pointed out in the operation of the system hereinafter.

Referring again to Fig. 1 of the drawings under normal conditions a pilot of an airplane flying at a particular altitude will observe on the screen of his kinescope the particular traffic conditions existing for his altitude at one or more fixes in advance of the airplane, all as illustrated by the solid line letters assigned to the fixes in advance of the various airplanes, each for its particular altitude. It is, however, desired to point out that a pilot of an airplane flying at a particular altitude, as for instance airplane IP3 flying to the rear of fix A in altitude 3, may by operating the hand knob HK (Fig. 3) to the 4 position (meaning altitude 4000) and have the aspect G/G indicated for fixes A and B in Fig. 1 for altitude 3000 changed to an aspect R/G (R over G, the last letter meaning the first signal ahead) indicated for altitude 4000 for fixes A and B in Fig. 1. In other words, if the pilot of an airplane finds traffic conditions in advance in his altitude unfavorable he may look, so to speak, into the adjacent altitude above or below the altitude in which he is flying to see whether traffic conditions in one or the other of these adjacent altitudes is favorable, and if this is the case he may change altitudes in order to hurdle a slower airplane in advance in the altitude assigned to him. In the case just considered such change of altitude can however not be made because the pilot has been informed that approach control is in effect at both of fix-altitudes A4 and B4, meaning that there must be an airplane flying in the same section he is in but one altitude higher, an unsafe condition. In this connection it may be pointed out that a pilot when investigating traffic conditions in adjacent altitudes must observe a traffic aspect of N/N in order to be permitted to fly into such adjacent altitude. As aspect N/N in an adjacent altitude manifests to the pilot that the block to the rear, the block in which he is flying, and the block in advance in such adjacent altitude is unoccupied, which is a safe condition for entering such adjacent altitude. This feature of applicants' invention is due to the approach control provided and will be more specifically described hereinafter.

It may be pointed out at this time that there is a possibility of a pilot, after observing favorable traffic conditions in an adjacent altitude, will enter such altitude and will then find that traffic conditions have changed in the meantime by reason of an airplane approaching from the rear in such adjacent altitude. In this event it will be necessary for him to return to his original altitude. This is perfectly safe in that the holding feature of the system which is devised to allow a pilot to circle to effect a holding operation will hold traffic conditions in his original altitude for a time long enough for him to have returned from such adjacent altitude to his original altitude.

*Structure*

*Airplane carried structure.*—Referring to Fig. 3 of the drawings it will be observed than an airplane IP2 has been illustrated equipped with suitable airplane carried radio communicating apparatus. Near the front of the airplane and constituting part of this apparatus is a scanning antenna SA which may be of any suitable construction but is preferably of a construction such as illustrated in the prior applications of Wight, Field and Saint or Dicke, above referred to. This scanning antenna SA, illustrated conventionally as a scanning shaft supported at right angles on a scanning shaft, is connected through the medium of a scanning receiver SAR, to suitable filtering apparatus FSI, and altimeter controlled contacts and a push button PB, to a kinescope including a screen S. By reference to the copending application of Wight, Field and Saint or Dicke just referred to it will be readily understood that this screen S will have displayed thereon pictorially each of the active ground radio transmitting stations in advance of the airplane within radio communicating distance, and juxtaposed thereon in substantially the same relation to each other as they are located in the field. It should be understood that the filter portions F2 and F3 of the filter FSI are constructed to admit only received radio energy characteristic of the altitude 2 or 3, as the case may be, then selected by the contact 20 of the altitude contact mechanism AC more specifically shown in Figs. 5A, 5B and 5C of the drawings.

This receiving apparatus also includes a hand knob HK which may be manually operated by the pilot and by the use of which the pilot may observe traffic conditions in advance in other altitudes than the particular altitude at which he is flying. It will be observed that the contact 20 controlled by the altimeter contactor AC is shown in the position 2 where it selects the filter portion F2 of the filter FSI which signifies that the airplane IP2 is flying at altitude 2000 as a result of which there is indicated on the screen S traffic conditions in advance of this airplane IP2 for altitude 2000. If now the pilot operates his hand knob HK to the 3 position, signifying an altitude of 3000 feet, and if he then depresses the push button PB the screen S will be changed to indicate the same ground radio transmitting stations but with the spots identifying such stations flashing codes characteristic of those stations and also of traffic conditions in advance for altitude 3000. Similarly the contact 24 of the altimeter contactor selects the filter portion 12 of the filter FPI, so that the airplane identifying code picked up by antenna PA is one which was radiated from the same altitude 2000 which was presumably coded by the coder 25 on the same airplane and radiated from the tail antenna TA of the same airplane but at a different carrier frequency, and received by the same or a different carrier frequency as passed by receiver SAR, it being received by receiver PR, and modulated to frequency 12.

As just stated, if desired, the radio information transmitted by ground stations to perform this checking function and picked up by antenna PA on the airplane (Fig. 3) may be transmitted at a different carrier frequency. In this case an additional ground transmitter and directional antenna would be employed at each ground station. The antenna PA on each airplane is of course also of broad angle directional construction for the particular carrier frequency employed.

As pointed out hereinafter, it is proposed to emit continuous energy producing a non-flashing spot on the screen under danger, that is, hold traffic conditions R, to code the radio energy by coding apparatus located at the ground station under consideration to flash the radio beam at a high rate for proceed traffic conditions G and at a low rate for normal traffic conditions N. By normal traffic conditions is meant the traffic conditions that normally exist, namely that there is no airplane approaching such fix within two blocks or sections in the rear for the altitude in question (3000 foot altitude in the present case). It should be understood that even though a so-called normal radio beam may be emitted by a ground station this ground station may be potentially clear (N followed by dotted G, see Fig. 1) or may be potentially hold (N followed by dotted R, see Fig. 1). The filter FPI is, as above mentioned, provided with filter elements F12 and F13. The portions of the filter FSI identified by reference characters F2 and F3 signify altitudes 2000 and 3000 feet respectively, whereas the tens numeral 1 of the characters F12, F13, and so forth, signifies that only radio energy shall pass therethrough which is characteristic of airplane identity for these altitudes but coded to identify the airplane on which it originated and not coded to signify traffic conditions in advance in this same altitude. This radio energy is received through the medium of receiver PR and filter FPI. In this connection it should be understood that each airplane is provided with a tail transmitter TT which emits radio energy of carrier frequency F modulated at an altitude frequency selected by the contact 21 and emitted through the medium of a rearwardly directed tail antenna TA.

It will be observed that this tail transmitter TT transmits energy of carrier frequency F and of an altitude character 2, 3 or 4 depending upon the position assumed by the contact 21 of the altitude contact mechanism AC. In other words, when the airplane IP2 is flying at the 2000 foot altitude the contact 21 assumes the position 2 and if the airplane then advances to the 3000 foot altitude the contact 21 will be automatically moved to select the modulating generator portion F3 of the modulating frequency generator FG. The airplane carried apparatus is also provided with a coder including a coding wheel 26 which codes the radio energy emitted by the tail antenna TA so as to characterize that particular plane.

In order for the pilot to conveniently make a continuous check as to the operativeness of his apparatus, a checking radio receiver CR has been provided. This receiver has an antenna element located in the field of the tail antenna TA. This check receiver CR is provided with a filter FCI having associated filter elements F2, F3, etc., which are selected by the contact 22 of the altimeter contact mechanism AC. The energy picked up and selected by the particular filter element selected by the altimeter contact 22 may then flow through the relay W so as to cause this relay to follow the code of the radio beam emitted rearwardly by the airplane IP2. It will be observed that the filter elements F2 and F3 of the filter FPI constitute a second checking instrumentality and are connected one at a time to the relay Y in accordance with the position then assumed by the contact 24 of the altimeter contactor AC.

From this consideration it is readily understood that the relay W will pick up and drop in accordance with the code transmitted locally by the rearwardly directed tail antenna TA whereas the relay Y will bob up and down in accordance with the radio energy generated at a ground radio transmitter, coded in accordance with the coded tail transmitted energy received at the next ground station in the rear. These relays W and Y are provided with contacts 27 and 28 which are included in correspondence circuits for the relay Z. This relay Z is rather quick acting and by reason of the fact that the two energizing circuits for this relay Z pass through back contacts and front contacts respectively associated with the movable contacts 27 and 28 of these relays it is readily seen that the relay Z will only assume its picked up condition if the contacts 27 and 28 operate in perfect synchronism. In this connection, it should be understood that the contacts 27 and 28 are preferably make-before-break so that if these contacts 27 and 28 operate in synchronism the energization of the relay Z is continuous in spite of code following operation of these contacts 27 and 28. These contacts 27 and 28 will of course operate in perfect synchronism if there are no other airplanes around and if the airplane carried apparatus and the apparatus at both the first ground station ahead and the first ground station in the rear are in proper working condition.

The relay Z has associated therewith an indicating lamp ZL which will be lighted only when this relay Z assumes its energized condition. Similarly, the relays W and Y have associated therewith lamps WL and YL, respectively, which for obvious reasons are lighted only when the corresponding relay assumes its energized position. It should also be observed that the relay W has connected in multiple therewith a lamp 31 whereas the relay Y has connected in multiple therewith a lamp 32. These lamps 31 and 32 will of course follow the code characters impressed on these relays W and Y respectively. In this connection it should be understood that the lamps 31 and 32 may only be used in the event the lamps WL and YL, respectively, are omitted and that in practice the relay Z and its associated lamp ZL may be omitted if desired it being understood that the correspondence between the transmitted code and the received code may be observed from the lamps 31 and 32 flashing in synchronism. If the relay Z is omitted for this reason the relays W and Y may also be omitted in which event the lamps 31 and 32 alone will be relied upon for the desired check information.

Although many of the devices illustrated in Fig. 3 have been shown rather conventionally it is believed that this conventional showing is sufficient in view of the advanced status of the art in radio communication. It may, however, be pointed out that suitable generators are associated with the scanning antenna SA for the purpose of generating voltages for application to the sweep plates of the kinescope including the screen S, and these generators have been specifically disclosed in the applications of Wight et al. and Dicke, above referred to. The letter F assigned to the filters FPI and FSI signify that the carrier frequency received by the scanning antenna receiver SAR is of carrier frequency $f$ whereas the characters F2, F3, F12 and F13, signify four different kinds of modulating frequency superimposed on this carrier frequency $f$. As above pointed out two distinct carrier frequencies may be used. It may be pointed out that of these modulating frequencies the frequencies F2 and F12 have been assigned to altitude 2000, the frequencies F3 and F13 have been assigned to altitude 3000, and the frequencies F4 and F14 would have been assigned to altitude 4000 if it had been illustrated. The modulating frequency generator FG associated with the tail transmitter TT is capable of generating current of carrier frequency F which is modulated at frequencies F2 or F3 depending upon the particular altitude 2000 or 3000 at which the airplane is flying as determined by altimeter contact 21 (Figs. 3, 5A and 5C). The filter FCI associated with the check receiver CR is of course constructed to receive carrier frequency F modulated at modulating frequencies F2 or F3 depending upon the position then assumed by the contact 22 of the altimeter contact mechanism AC. Both of the carrier frequencies F and $f$ proposed to be employed in the present system are ultra-ultra-short-wave length frequencies in order that the antenna SA may be highly directional. The tail antenna TA preferably emits radio energy spread in a conical direction through an angle of substantially 90° whereas the individually focused radio antennae, four of which have been illustrated, of the scanning antenna SA will only receive radio energy within very small spread of the focal axis of the particular receiving antenna focusing cup then effective. This angle of spread is preferably about two to five degrees.

Let us now refer to Figs. 5A and 5B of the drawings and observe the construction of the altimeter contact mechanism AC shown conventionally in Fig. 3 of the drawings and illustrated more specifically in Figs. 5A, 5B and 5C.

Referring to Fig. 5A the altimeter contact mechanism includes a bellows or Sylphon SY which is evacuated and which has a collapsing tendency against the force of the spring 35 depending on the atmospheric pressure and therefore depending on the altitude at which the airplane is flying. This Sylphon SY is held in a predetermined expanded condition depending upon the atmospheric pressure by a U-shaped spring 35 and is provided with an arm 36 which will sweep about the U-shaped part of the spring 35 as a pivot through an arc dependent upon the change in atmospheric pressure and will thereby, through the medium of the arm 36 and the link 37, rock the angle lever 38 supported for movement about a pin 39 so as to cause the arm 38a to pull or release the chain 41 against the tension of the hair spring 30, depending upon whether the atmospheric pressure is rising or falling respectively. As a result of this action the pointer 45 is operated through the medium of the drum 44 in a clockwise direction if the atmospheric pressure is falling (altitude increasing) and in a counter-clockwise direction when the atmospheric pressure is increasing (altitude decreasing). In other words, the altitude indicating pointer 45 is moved in a clockwise direction as the altitude of the airplane is increased.

In order to have the pointer 45 indicate the altitude accurately in spite of variations of the atmospheric pressure at sea level the manually operable adjusting knob AK is provided to adjust the position of the dial plate 47. This dial plate 47 may be adjusted by the pilot in accordance with information received by him through the medium of radio communication, and may be adjusted to a position to indicate with respect to a stationary pointer 34 the atmospheric pressure at sea level for that particular locality. This turning of the manually operable knob AK, through the medium of the pinion 46, will rotate the toothed scale plate 47 with respect to which plate the pointer 45 is read. In other words, if the knob AK is adjusted to indicate atmospheric pressure at sea level by pointer 34 the pointer 45 will indicate the altitude at which the airplane is flying under this atmospheric pressure condition. It is this latter construction that distinguishes the altimeter from a barometer. At the end of the shaft 43, on which the chain drum 44 and pointer 45 are supported, is provided a mirror MI for purposes presently to be described.

A suitable light source such as a lamp L is provided on the axis of the shaft 43 beyond the mirror MI. Between this lamp L and the mirror MI is provided a condensing lens CL which concentrates the light emitted by the lamp L into a narrow beam striking the mirror MI at the point substantially in the axis of the shaft 43. It is readily seen that by this construction the light beam reflected by the mirror MI will rotate in a plane at right angles to the axis of this shaft 43 and that this light beam will rotate in exact synchronism with rotation of the shaft 43. Adjacent this rotating light beam is provided a wheel rim 48 which supports two light responsive cells LCI and LC2. These light responsive cells are included in the circuits of relays DR and UR respectively. These cells may be of selenium construction but are preferably light responsive cells of the photo-electric type. The cell LCI is shown included in a circuit which may be traced from the terminal (+) of a suitable source of current, slip ring 40, through cell LCI, winding of the down relay DR, and back contact 49 of the up relay UR to the terminal (−). It is of course understood that in practice suitable amplifying means not shown may be employed to amplify the current produced by the photo-electric cell. A similar circuit for the relay UR may be traced from the terminal (+), slip ring 40, through the light responsive cell LC2, winding of the relay UR, and back contact 50 of the relay DR. These relays DR and UR are provided with contacts 51, 52, 53 and 54 which for obvious reasons will cause current of one polarity or the other to be applied to the motor M of the permanent magnet field type or induction type, the polarity depending upon which of the two relays DR or UR assumes its energized condition.

It will be observed that the relay DR may be picked up by depression of the push button contact PD whereas the relay UR may be picked up by depression of the push button contact PU. These push button contacts are provided for test purposes and should not be used during route flying. It will be observed (see Fig. 5A) that the motor M (also shown in Fig. 5B) is operatively connected to the gear 42 rigid with ring 48 through the medium of the gear 55. It is thus readily seen that if the pointer 45 and the light beam are moved clockwise by the altimeter from its normal position in which the light beam strikes between the two light responsive cells this light beam will impinge on the light responsive cell LC2 thereby causing the flow of current through the relay UR which results in the operation of the motor M in a direction to cause clockwise rotation of the rim 48 (as viewed from the right in Fig. 5A) to cause the two light responsive cells LC1 and LC2 to again assume positions on opposite sides of the light beam in its new location. In other words, the light responsive cells LC1 and LC2 are caused to assume positions corresponding to the position assumed by the altitude pointer 45.

In practice the dial 47 back of pointer 45 is provided with indications indicating only altitudes up to an altitude of 10,000 feet whereas in practice airplanes will fly in altitudes up to 20,000 feet. In other words, the pilot must be relied upon to properly read and interpret the altimeter including the pointer 45. In order to provide contacts which complete a different circuit for each altitude between 1,000 feet and 20,000 feet contact arms 20, 21, 22 and 24, of which the contact arm 21 only has been shown, are provided (see Fig. 3). These contact mechanisms are driven through gear mechanism so as to rotate only one complete revolution for two complete revolutions of the pointer 45. This gear reduction is provided through the medium of the gears 42 and 57, the gear 57 having twice the diameter of gear 42. The contact arms 20, 22 and 24 are also carried by the shaft 58 which carries the contact arm 21. Of these contact arms 20, 21, 22 and 24 the arm 21 is more specifically shown in Figs. 5A and 5B of the drawings. In order to provide an additional indicator which does not require interpretation by the pilot as to whether he is flying in the first 10,000 feet of altitudes or the second 10,000 feet of altitudes a second pointer 60 (see Figs. 5A and 5B), which rotates only half as fast as shaft 43, has been provided to visually indicate the actual altitude at which the airplane is flying.

*Ground located structures.*—In Figs. 4A, 4B and 4C have been shown the ground located apparatus for three fixes at the approach to an airroute crossing illustrated in Figs. 4DX1 and 4DX2. The expression DX represents a fix D of an eastbound route combined with a fix X of a northbound route crossing the eastbound route at fix D.

The apparatus at each fix includes a radio transmitter T having a prefix letter corresponding to the direction in which a radio directional antenna is directed and a suffix corresponding to the letter identifying that fix. For fix A (Fig. 4A) this radio transmitter has been designated WTA and the directional antenna associated therewith has been indicated by the letters WDAA. This directional antenna WDAA directs its radiating energy upwardly and rearwardly with respect to the direction of travel over the route, the route under consideration being an eastbound route. This radio transmitter WRA transmits radio energy of ultra-ultra short-wave length of frequency $f$ and has associated therewith other means for modulating this carrier frequency $f$ at modulating frequencies, two frequencies for each altitude of airplane flight. As shown for fix A this transmitter WTA has associated therewith a frequency generator FG capable of modulating the frequency $f$ at modulating frequencies F2 and F12 for altitude 2000, F3 and F13 for altitude 3000, and F4 and F14 (not shown) for altitude 4000. Similarly, each fix, such as fix A (Fig. 4A) is also provided with a radio receiver ERA, the letter E designating that the directional antenna EDAA associated therewith is directed eastwardly to receive radiated energy from the tail end of a departing eastbound airplane. This receiver ERA has associated therewith a filter FI which is capable of receiving ultra-high carrier frequency F modulated at either the modulating frequency F2 or F3, as conditions require depending on the altitude at which such airplane is flying. In fact, radio energy may be received modulated to a plurality of these frequencies, each modulating frequency being used to perform a particular function associated with the altitude to which such modulating frequency is assigned. It is of course understood that these modulating frequencies F2, F3 are associated with altitudes 2000 and 3000, respectively.

For each altitude at each fix there are provided a group of relays ALRP, AR, ARP, TR, TRP, TRPP, TLR, TLRPF, TLRPB, CR, CRP and TE. The reference characters in the specification for each of these relays has a proper prefix to identify the fix and the altitude with which that particular relay is associated. For instance, these relays for fix A altitude 2000 are each provided with a prefix A2, and similarly, these relays for the altitude 3000 for fix B are provided with a prefix B3.

It is readily seen that the relay TR for altitude 2000, fix A, is connected to the output side of the filter FI associated with the radio receiver ER in a manner to receive only radio energy of carrier frequency F and modulated at frequency F2. In other words, this relay TR will respond to energy radiated from the rear of an airplane departing from fix A in an eastwardly direction provided that this airplane flies at a 2000 foot altitude and radiates energy of carrier frequency F modulated at modulating frequency F2. Since each airplane (Fig. 3) radiates rearwardly directed energy characteristic of the altitude at which the airplane is flying and coded at a rate to characterize the particular airplane, the tail relay A2—TR (Fig. 4A) will follow the code of an airplane flying eastwardly at an altitude 2000 and departing from fix A, which energy is coded to characterize that airplane. Therefore, the relay A2—TR may be conveniently called the tail relay for fix A, altitude 2. This relay A2—TR (Fig. 4A) has associated therewith a slow-dropping repeater tail relay A2—TRP which remains up for any code and which in turn controls a second repeater relay A2—TRPP.

Referring now to Fig. 4B it will be observed that the tail relay B2—TR through the medium of its contact 163 repeats the code received thereby into the tail line repeater relay A2—TLR (Fig. 4A). In other words, if an eastwardly flying airplane flying at the 2000 foot altitude in block B—C radiates a code characteristic of that airplane this radio energy code will be received by both the directional receiving antenna EDAA (Fig. 4A) and the eastwardly directional radio antenna EDAB (Fig. 4B) to cause code following operation of both of the relays A2—TR and A2—TLR (Fig. 4A) in unison or synchronism. It should be observed that the tail line relay A2—TLR (Fig. 4A) is provided with a front contact repeater relay A2—TLRPF and a back contact repeater relay A2—TLRPB, both of these relays A2—TLRPF and A2—TLRPB are slow dropping or decoding relays which remain up continuously so long as the relay A2—TLR follows any airplane code. Code following operation of the relay A2—TLR will therefore cause both of these repeater relays A2—TLRPF and A2—TLRPB to assume their energized positions continuously.

Since the circuit for the correspondence relay A2—CR includes a front contact 136 of the relay A2—TLRPB and a front contact 139 of the relay A2—TRP as well as correspondence contacts 137 and 138 of relays A2—TR and A2—TLR respectively, for both simultaneous energization and simultaneous deenergization of these relays, it is readily seen that under the condition assumed, namely, with an eastbound airplane flying at 2000 foot altitude at a point just beyond fix B will cause the correspondence relay A2—CR to be substantially continuously energized. This relay A2—CR is a slow pick-up relay, requiring say about ten seconds to pick up, and since it is also quick dropping it will drop in response to a momentary deenergization of its energizing circuit and will only be picked up if synchronous operation of relays A2—TR and A2—TLR takes place. If desired the contacts 138 of relay A2—TR and the contacts 137 of relay A2—TLR may be constructed make-before-break so that the circuit for the correspondence relay A2—CR is not at all broken during synchronous code following operation of the relays A2—TR and A2—TLR when following the same code. It should be understood that the tail repeater relay A2—TRP is also a decoding relay slow enough in dropping so as to remain up continuously during the reception of any airplane code by the tail relay A2—TR. The correspondence relay repeater A2—CRP is preferably slow dropping to a slightly greater extent than the repeater relay A2—TRP is slow dropping. This timing is resorted to so that dropping of the relay A2—TR, as by an airplane getting out of range, will not drop time element relay A2—TE. The airplane getting out of range will cause relay A2—TRP to drop causing momentary opening of contact 164 of relay A2—TRPP when contact 145 of relay A2—TRP is open and this function must take place while front contact 174 of relay A2—CRP is still closed to prevent dropping of time element relay A2—TE.

As an example, if the repeater relay A2—TRP requires say one second to drop it is proposed to design its associated relay A2—CRP so as to require about 1½ seconds to drop. The back contact 172 of relay A2—CR of course closes before front contact 173 of relay A2—TCRP opens and time element relay A2—TE is held energized through contacts 172 and 174 of relays A2—CR and A2—CRP while contacts 145 and 164 of relays A2—TRP and A2—TRPP are both open. Also, the relay A2—TCRP is slightly slower to release than the sum of the pick-up times for relays A2—CR and A2—CRP. This provision of timing is desirable and is resorted to in order to prevent deenergization of the time element device A2—TE when an airplane passes the next location in advance resulting in the picking up of relays A2—TLRPF, A2—CR and A2—CRP. The picking up of relay A2—TLRPF by the opening of its back contact 144 causes deenergization of relay A2—TCRP (this will however not drop by reason of its slow dropping feature) and by the synchronous operation of contact 137 of relay A2—TLR with contact 138 of relay A2—TR will cause picking up of relays A2—CR and A2—CRP, and the timing just mentioned will cause closing of front contact 142 of relay A2—CRP before the drop-away time of relay A2—TCRP has expired, so that with the relay A2—TCRP, now energized through front contact 142 of relay A2—CRP the relay A2—TCRP, will not drop at all. It may be pointed out here that these timing features are also required to cause dropping of the time element relay A2—TE when an airplane circulates to perform a holding function. That is, when an airplane at 2000 feet in section A—B, and in the rear of another airplane in section B—C, turns enough to get out of tail energy transmitting relationship with the ground receivers at station A the relays A2—TR and A2—TRP will begin to pick up and drop in synchronism which results in the picking up of relay A2—CR, opening of its back contact 172, and dropping of time element relay A2—TE, the relay A2—TCRP under the assumed condition being in its deenergized condition.

These specific delay times may be varied depending upon the codes employed and the other factors and the particular pick-up time of ten seconds for relay A2—CR and dropping time of say twelve seconds for relay A2—TCRP assumed are merely exemplary for the purpose of disclosure of the present invention, it being understood that the applicants do not limit themselves to these specific delay times.

The time element relay TE is very quick dropping and is so slow in picking up that it requires substantially five minutes of continuous energization to pick it up. Obviously an ordinary relay could not be used for this purpose and it is proposed to employ a motor operated time element device, such, for instance, as disclosed in Fig. 5 of the pending application of Field, Ser. No. 476,207, filed February 17, 1943, now Patent No. 2,378,293 dated June 12, 1945. When this time element device of the Field application is employed the shunt-out feature performed by relays AR and DTR disclosed therein will of course be omitted, this omission of the shunt-out feature is equivalent to having the contacts 161 and 118 of relays AR and DTR continuously open. If this time element device of the Field application is employed herein the wire leading from contact 114 of relay MR (shunting contacts 116 and 118 of relays AR and DTR omitted) of such prior application becomes the wire leading into the winding of the relay TE of the present invention and the contacts 154 and 168 of the relay TE in the instant application will be controlled by the relay LR of the prior application. In other words, the motor timing apparatus and associated relays of the prior Field application may be substituted for the relay TE of the instant application. It is readily understood from the prior application of Field that momentary opening of the contact 114 of the Field application results in immediate opening of front contact 106 of the relay LR thereof and that the closing of the contacts 114 results in the starting of the timing operation and if these contacts 114 remain continuously closed long enough the relay LR will be energized when this time period has been consumed. Obviously, the relay CR for the various altitudes and fixes of the instant application may also be replaced by a time element structure such as disclosed in the prior Field application.

It may be pointed out here that the control circuits for the various relays for the various altitudes for fixes A and B (Figs. 4A and 4B) are identical and that corresponding apparatuses for the fix C are only slightly different by reason of the fact that this fix C is an approach fix to an automatic crossing fix DX shown in Figs. 4DX1 and 4DX2 of the drawings. One of the principal differences is that the tail line repeater relay C2—TLR is a normally energized relay whereas the corresponding relays for fixes A and B are normally deenergized relays. For this reason it is necessary that the correspondence contacts 138 and 137 for relays C2—TR and C2—TLR be inversely connected to that of the connection of similar contacts for the relays at fixes A and B. That is, in Fig. 4B the correspondence relay B2—CR will only pick up if the relays B2—TR and B2—TLR pick up and drop in synchronism whereas the correspondence relay C2—CR (Fig. 4C) will only pick up if the relay C2—TR is in an energized condition each time the relay C2—TLR is in a deenergized and vice versa. There is another slight difference between the structures shown in Figs. 4B and 4C in that the relay C2—TLRPF is provided with an additional contact 165 not provided for the relay B2—TLRPF. The purpose of this additional contact is to provide two hold signals for airplanes approaching an automatic crossing. That is, if the crossing is not available this is manifested not only at the crossing fix but is also manifested at the approach fix.

At each fix there is provided suitable coding apparatus which for the purpose of disclosure of the invention only has been illustrated by coding wheels APW, ANW and ARW for fix A (Fig. 4A). These code wheels are driven by a coding motor AM which has been conventionally illustrated as an induction motor. In practice there is preferably a gear reduction between the motor AM and the code wheels APW, ANW and ARW which gear train for convenience has been omitted. Similar code wheels BPW, BNW and BRW, CPW, CNW and CRW, and DXPW, DXNW and DXRW driven by motors BM, CM and DXM, respectively, have been illustrated for fixes B, C and DX, respectively.

As illustrated, a portion of each code wheel transmits a code identifying the fix whereas the remaining portion of the code wheel is constructed to produce uniformly spaced code pulses, except for the most restrictive code wheel including a reference letter "R" which emits continuous energy during the traffic controlling portion of its revolution. The code wheel APW has closely spaced teeth 70 to produce a high rate or proceed code whereas the code wheel ANW has similar teeth 71 which are wider and spaced somewhat farther apart which teeth are provided to produce a low rate or normal code. Similar teeth 70 and 71 are provided for corresponding code wheels illustrated in Figs. 4B, 4C and 4DX of the drawings.

Referring to Fig. 4A the code wheels APW, ANW and ARW are provided with teeth 72 and 73 for characterizing the letter A, the tooth 72 being a dot creating tooth and the tooth 73 being a dash creating tooth. The code wheels BPR, BNW and BRW on the other hand are provided with teeth 74, 75, 76 and 77 to characterize the letter B which identifies fix B.

Referring now to Fig. 4C the teeth 78, 79, 80 and 81 on the code wheels CPW, CNW and CRW are of widths and are arranged in succession to characterize the letter C.

Referring now to Fig. 4DX the code wheels DXPW, DXNW and DXRW are provided with coding teeth 82, 83 and 84 to signify the letter D, and teeth 85, 86, 87 and 88 to characterize the letter X. These code wheels DXPW, DXNW and DXRW are driven by a coding motor DXM.

Directly over these code wheels for fix A is provided a three-wire bus consisting of bus wires 90, 91 and 92. It is readily seen the bus wire 90 during the traffic controlling portion of rotation of the code wheels receives uncoded energy through code wheel ARW from the associated battery AB1 (fix A), the batteries at other fixes being designated B1 with a prefix corresponding with the fix at which it is located. The bus wire 91 is coded by the coding wheel ANW (Fig. 4A) and the bus wire 92 is coded at a high rate by the code wheel APW (Fig. 4A.) Although any form of communication between fixes may be resorted to, such as radio communication, for convenience line wires 95, 96, 98, 99, C, 101, 102 and CC have been provided between fixes A and B. The wire C has included in series therein a battery AB2 whereas the wire CC has included therein a battery AB3. The section between fixes B and C is provided with similar line wires 105, 106, 108, 109, C, 111, 112 and CC of which the line wire C has included therein a battery BB2 and the line wire CC has included therein a battery BB3. Similar line wires are provided between fixes C and DX except that each wire is indicated by a number ten units greater, and of which the wire C has included in series therein a battery CB2 and the wire CC has included in series therein a battery CB3.

Referring now to altitude 2000, fix A (Fig. 4A), it will be observed that the tail relay A2—TR is energized through a circuit including the wires 130 and 131 which connect this relay A2—TR to the radio receiver ERA through the medium of the filter section F2 of the filter FI. In a similar manner the relay A3—TR is connected to this receiver ER through the medium of wires 131 and 132. It will be observed that relay A2—TRP is controlled through a circuit including the front contact 134 of the relay TR and that the repeater relays A2—TLRPF and A2—TLRPB are controlled through front and back contacts respectively including the movable contact 135 of the relay A2—TLR. The correspondence relay CR is controlled through a circuit including front contact 136 of the relay A2—TLRPB, correspondence contacts 137 and 138 of the relays A2—TLR and A2—TR, respectively, and a front contact 139 of the relay A2—TRP. The repeater relay A2—CRP is controlled through a front contact 140 of the correspondence relay A2—CR. The relay A2—TCRP is controlled through a circuit including front contact 142, back contacts 143 and 144 of the relays A2—CRP, A2—TRP and A2—TLRPF respectively, in multiple.

The time element device A2—TE is controlled by a control circuit including in series two groups of contacts each group of which includes a plurality of contacts in multiple. The first of these groups of contacts include back contact 172 of relay A2—CR and front contact 173 of relay A2—TCRP, and the second groups of contacts include front contacts 174, 145 and 164 of the relays A2—CRP, A2—TRP and A2—TRPP, respectively, in multiple. It should be observed that the tail repeater relay A2—TRPP is controlled through both front contacts and back contacts each including the movable contact 146 of the relay A2—TRP so that this relay A2—TRPP is energized irrespective of whether the relay A2—TRP assumes its energized or its deenergized position. It may, however, be pointed out that the windings of this relay A2—TRPP are oppositely poled so that each time the relay A2—TRP operates from an energized to a deenergized position or from a deenergized to an energized position the relay A2—TRPP assumes its deenergized position momentarily. This is by reason of the fact that pole changing of the magnetism in the core of this relay A2—TRPP requires the magnetism during its pole changing operation to go through zero value and this causes this relay to momentarily assume its deenergized position.

Referring now to fix (Fig. 4B) it should be observed that the approach relay B2—AR is controlled through a circuit which may be traced from the terminal (+) of the battery AB2, wire 89, back contact 147 of the relay A2—CR, front contact 148 of the relay A2—TR, wire 96, winding of the approach relay B2—AR, and wire C, back to the (—) terminal of the battery AB2. Similarly, the approach repeater relay B2—ALRP is controlled through a circuit beginning at the (+) terminal of the battery AB2, wire 89, front contact 149 of the relay A2—ARP (Fig. 4A), wire 99, winding of the relay B2—ALRP, and wire C, back to the (—) terminal of the battery AB2. The purpose of back contact 190 of relay TE will be pointed out hereinafter. It is thus seen that the approach relay B2—AR directly repeats the tail relay A2—TR for the same altitude at the next fix in the rear providing that the correspondence relay CR at such fix in the rear assumes its deenergized position. It is also observed that the approach repeater relay B2—ALRP directly repeats the approach repeater relay ARP for the next fix in the rear through the medium of the front contacts 149 of such approach repeater relay in the rear. In this connection it should be observed that the approach repeater relay A2—APR is a slow dropping relay and it should be understood that this relay will remain up continuously if its associated approach relay A2—AR is energized in code fashion. In other words, the relay A2—ARP is sufficiently slow dropping so as to remain in its energized position between code impulses.

It should also be observed (see Fig. 4A) that the wire 150 when energized is capable of causing the emission of radio energy of carrier frequency f and modulated at frequency F2. It will then be seen that this wire 150 is provided with uncoded energy signifying stop or holding traffic conditions in advance and, for altitude 2 fix A, this wire 150 is so energized through a circuit starting from the (+) terminal of the battery AB1, wire 66, brush 67, slip ring 68, code wheel ARW, brush 69, bus wire 90, back contact 151 of the relay A2—CRP, front contact 152 of the relay A2—TRP, and front contact 153 or 155 of the relays A2—ARP and A2—ALRP. It is readily seen that this uncoded energy is changed to energy coded at the high impulse rate (code wheel APW) if either the contact 152 of the relay A2—TRP assumes its deenergized position with the contact 154 of relay A2—TE remaining in its energized position, or both if the contacts 151 of relay A2—CRP and 154 of relay A2—TE assume their energized position with front contact 152 still closed. It is also readily seen that front contact 155 of relay A2—ALRP is in multiple with the front contact 153 of the relay A2—ARP so that with either one of these approach relays assuming their energized position the same partial circuit is closed. Furthermore, it is readily seen that if both of the contacts 155 and 156 of the relays A2—ALRP and A2—ARP, respectively, assume their deenergized position, that the transmitting feed wire 150 becomes energized by current pulsed at the low impulse rate to cause the radio transmitter WTA to emit the normal traffic indications.

As already pointed out hereinbefore, an airplane as it flies along the route emits so-called tail radio energy rearwardly which is received by one or more radio ground antennae in the rear and that this radio energy is retransmitted from the ground back to the same airplane through the medium of a different radio carrier frequency f transmitted from an antenna at the next fix in advance and impulsed at a code characteristic of that same airplane. As already pointed out the relay B2—AR directly repeats the tail relay A2—TR and attention is now directed to the fact that the front contact 158 of the approach relay B2—AR is the contact which repeats the code received by the tail relay A2—TR into the radio transmitter WTB at fix B through the medium of the carrier frequency f generated by frequency generator FG through a circuit including the wire 159. The current flowing over wire 150 is coded in accordance with traffic conditions and is modulated at frequency F2, and the current flowing over wire 159 is coded to identify the airplane directly in the rear of that fix and is modulated at frequency F12. It is thus seen that wires 150 and 159 supply energy to the radio transmitter WTB for generating two kinds of carrier frequency current for altitude 2, and in a similar manner wires 161 and 162 supply energy for similar purposes for altitude 3000 feet. Supplemental approach control in the form of a back contact 190 on relay TE is provided so that occupancy of a block where circling is taking place is manifested in advance.

The various code wheels, relays, contacts and wires for fix A altitude 2 have been identified by certain reference characters. It is now desired to point out that like wires and contacts at other fixes and altitudes have been assigned like reference characters except for the hundreds digit, whereas like relays, code wheels, transmitters, receivers, antennae, and the like, at the various fixes have been assigned like reference characters except for a prefix identifying the particular fix and the particular altitude of such fix involved.

The apparatuses for the fix portion D and the fix portion X for altitude 2000 for fix DX illustrated in Figs. 4DX1 and 4DX2 are identical to the apparatus shown for fix B or C except for the provision of controls imposed by two interlocking relays WEIR and SNIR, where the letters W, E, S and N denote directions. It is readily seen that these interlocking relays WEIR and SNIR have their pick-up circuits interlocked each through the medium of a back contact of the other interlocking relay.

Referring to Fig. 4DX2 it will be observed that the interlocking relay SNIR may be picked up through a pick-up circuit starting at the terminal (+) of a suitable source of current and including back contact 165 of the relay D2—ALRP (Fig. 4DX1), back contact 166 of the relay D2—ARP, back contact 167 of the interlocking relay WEIR in series and wire 181. Also, that interlocking relay WEIR may be stuck up through a stick circuit including its stick contact 168 and either the front contact 169 of the relay D2—ALRP or the front contact 170 of the approach relay D2—ARP. Similarly, interlocking relay WEIR is provided with a pick-up circuit which may be traced from the terminal (+) of a suitable source of current, back contact 175 of the relay X2—ALRP, back contact 176 of the relay X2—ARP, back contact 177 of the interlocking relay SNIR, wire 191, and the winding of the interlocking relay WEIR. Also, that interlocking relay SNIR includes a stick circuit including its stick contact 178 and including in multiple front contacts 179 and 180 of the relays X2—ALRP and X2—ARP, respectively.

Another difference between the structures at an interlocking fix and at an ordinary fix is that the contact 163 of the tail relay TR at an ordinary fix is a front contact whereas the corresponding contact 63 or 363 at an automatic interlocking fix is a back contact and that an additional front contact 164 or 364 of an interlocking relay is included in series therewith at an interlocking fix, from which it is readily seen that the tail line relay C2—TLR (Fig. 4C) is energized under favorable traffic conditions at the interlocking fix next in advance thereof whereas the tail line relay at an ordinary fix such as relay A2—TLR (Fig. 4A) is deenergized under favorable traffic conditions in advance in that it is controlled through a front contact 163 of the tail relay B2—TR for the same altitude of the next fix B in advance (Fig. 4B). The contact 164 (or 364) of an interlocking relay, when open, causes occupancy manifestation at the fix in the rear by dropping of the tail line relay TLR. Also, since contact 185 has been shifted from relay C2—TLRPF (Fig. 4C) to constitute a back contact 185 of the interlocking relay WEIR (Fig. 4DX1), this latter contact causes a danger aspect to be displayed at the interlocking fix.

Operation

*Operation over airroute.*—By referring to Fig. 1 it will be observed that in altitude 3000 there has been illustrated only one airplane IP3 flying eastwardly and approaching the fix A whereas for the 2000 foot altitude three eastbound airplanes IP2, 2P2 and 3P2 have been illustrated approaching the fixes D, B and A, respectively. These airplanes IP3, IP2, 2P2 and 3P2 have also been illustrated in Figs. 4A-4C and additional airplanes have been shown in Fig. 1 of the drawings. An airplane NP2 for the northbound route has been shown in Fig. 4DX2.

Let us first observe what effect an airplane equipped with the apparatus illustrated in Fig. 3 of the drawings will have upon ground located stations in the rear, after which it will be pointed out how approach control extending to at least two ground stations in advance of the airplane is accomplished.

Referring to Fig. 4C the airplane IP2, also shown in Fig. 3, will radiate radio energy rearwardly and downwardly as shown in Figs. 3 and 4C so as to activate the eastwardly directed directional antenna EDAC and EDAB (Fig. 4B). This radio emitted tail energy will of course be coded to characterize the airplane IP2 as already described in connection with Fig. 3 of the drawings. Furthermore, this radiated radio energy will be of a frequency F upon which is superimposed a modulating frequency F2 so that the radio energy received by both of the radio receivers ERB (Fig. 4B) and ERC (Fig. 4C) will freely flow through the filter portion F2, from whence the coded current may flow down the wire 130 at each fix through the winding of the relays B2—TR and C2—TR and then back up through the common wire 131 connected to the filter FI of which there is one associated with each of the two radio receivers ERB and ERC. The received current after being detected (rectified) will not be able to flow through any other filter, such as fi'ter F3. Obviously, the two tail relays B2—TR and C2—CR will operate in synchronism to characterize the code emitted by the airplane carried apparatus of airplane IP2. At fix C (Fig. 4C) the code following operation of the tail relay C2—TR and the intermittent closing of its contact 134 will cause the tail repeater relay C2—TRP to assume its energized condition and remain continuously energized. With this relay C2—TRP assuming its energized condition, resu'ting in the closure of its front contact 152, it will cause the radio transmitter WTC (Fig. 4C) to emit radio energy conventionally illustrated by the dotted line R2 to the airplane 2P2 flying in the second section to the rear of the section in which the airplane IP2 is flying. This emitted radio energy will be of carrier frequency *f* and will be modulated to modu'ating frequency F2 (meaning the modulating frequency manifesting traffic conditions for altitude 2000). This radio frequency energy will be uncoded thereby signifying danger traffic conditions in advance meaning that an airplane flying in block B—C and receiving such indication must hold and not pass the fix C. The circuit for supp'ying this uncoded energy to the west radio transmitter WTC may be traced from the terminal (+) of the battery CB1 (Fig. 4C), wire 66, brush 67, slip ring 68, code wheel CRW, brush 69, wire 90, back contact 151 of the relay C2—CRP, front contact 152 of the relay C2—TRP, front contact 185 of the relay C2—TLRPF, front contact 155 of the approach re'ay C2—ALRP, wire 150, the portion F2 of the modulating frequency generator FG, wire 169, back to the other terminal of the battery CB. This front contact 155 would not be closed were it not for the fact that there is an airplane approaching fix C within two blocks in the rear. The pilot in the airplane 2P2 (Fig. 4A) is thus informed of danger traffic conditions in the second block in advance of his airplane. As already pointed out this danger indication (R2) is in part due to the fact that his own airplane 2P2 radiates tail energy to cause the approach relay C2—ALRP to assume its energized position to close its front contact 155 included in the circuit just traced. The reason for this approach relay C2—ALRP assuming its energized position will be described presently.

Code following operation of the tail relay C2—TR will through the medium of its front contact 163 cause code fo'lowing operation of the tail line relay B2—TLR (Fig. 4B) through a circuit which may be traced from the terminal (+) of the battery BB3, wire 134, winding of the relay B2—TLR, wire 112, front contact 163 of the relay C2—TR, through the common return wire CC connected to the other terminal of the battery BB3. For like reasons as above pointed out in connection with altitude 2000 at fix C, the tail relay B2—TR will be picked up intermittently and the repeater relay B2—TRP (Fig. 4B) wi'l also asume its energized position continuously in response to the reception of radio energy by the receiver ERB and from airplane IP2. It is thus readily seen that the two tail relays B2—TR and B2—TLR will pick up and drop in synchronism, the former receiving its energy through the medium of receiver ERB and the latter through the medium of receiver ERC, as a result of which the front contacts 137 and 138 of relays B2—TLR and B2—TR will pick up and drop in synchronism. Also, the intermittent dropping of the tail line re'ay B2—TLR will through the medium of its back contact 135 cause intermittent energization of the back repeater relay B2—TLRPB which results in this latter relay assuming its energized position continuously. The following circuit for the correspondence relay B2—CR will therefore be substantially continuously c'osed: starting at the terminal (+) of a suitable source of current, front contact 136 of the relay B2—TLRPB, contact 137 of the relay B2—TLR, contact 138 of relay B2—TR, front contact 139 of the relay B2—TRP, through the winding of the correspondence relay B2—CR, to the other terminal of said source of current. The relay B2—CR is very quick dropping and very slow picking up so that it is assured that this relay B2—CR will only asume its energized position if the relays B2—TR and B2—TLR operate in perfect synchronism. The picking up of the contact 151 of the correspondence re'ay B2—CRP, this relay being a slow dropping repeater relay for the relay B2—CR, causes proceed coded energy, coded at a high rate by the code wheel BPW, to be applied to the west transmitter WTB instead of non-coded energy as was the case at this 2000 foot altitude of fix C with the airplane IP2 still occupying the section C—D.

The circuit for transmitting this proceed coded energy may be traced from the battery BBI, wire 66, brush 67, slipring 68, code wheel BPW (Fig. 4B), contact brush 65, bus wire 92, front contact 154 of the time element relay B2—TE, front contact 151 of the correspondence repeater relay B2—CRP, front contact 152 of the relay B2—TRP, front contacts 153 and 155 of the relays B2—ARP and B2—ALRP, in multiple, wire 150, to the portion F2 of the modulating frequency generator FG through the common return wire 169 to the other terminal of the battery BBI. The dotted line G2, extending from the radio transmitter WTB at fix B to the airplane 2P2, signifies the reception of proceed traffic condition radio energy by the airplane 2P2 insofar as the ground station image in the lower portion of the screen S of his kinescope is concerned. In the upper portion of the screen S the pilot will observe the second signal in advance, namely, an image of the radio station at fix C and will observe that this latter signal is uncoded as conventionally shown by the dotted line R2. The pilot of the airplane 2P2 therefore receives a hold-over-proceed (R/G) traffic condition indication. The circuit just traced through the front contact 154 of the relay B2—TE included approach relay contacts 153 and 155.

We will now point out how the code following approach relay B2—AR (Fig. 4B) and its slow dropping repeater relay B2—AP are picked up at fix B (Fig. 4B) and how the approach relay C2—ALRP at fix C (Fig. 4C) is caused to assume its energized position continuously under the traffic conditions illustrated in Figs. 4A-4C. Referring to Fig. 4A it will be observed that the radio tail energy emitted by airplane 2P2 strikes the directional antenna EDAA to thereby cause the tail relay A2—TR to follow the code characteristic of the airplane 2P2. Code following operation of the relay A2—TR through the medium of its contact 148, with back contact 147 of the relay A2—CR closed, will cause code following operation of the approach relay B2—AR (Fig. 4B). The circuit for causing such operation of the latter relay may be traced from the (+) terminal of the battery AB2, wire 89, back contact 147 of the relay A2—CR, front contact 148 of the relay A2—TR, wire 96, winding of the relay B2—AR through common return wire C, and back to the other terminal of the battery AB2.

The circuit just traced will cause code following operation of the relay B2—AR which through the medium of front contact 157 of this relay will cause the approach repeater relay B2—ARP to assume its energized position continuously. With this latter relay B2—ARP continuously energized it will through the medium of its front contact 149 cause the approach line relay C2—ALRP to assume its energized position continuously through a circuit which may be traced from the terminal (+) of the battery BB2, wire 89, front contact 149 of the relay B2—ARP, wire 109, winding of the relay C2—ALRP, to the common return wire C connected to the (—) terminal of the battery BB2. It is thus seen that each airplane will produce approach control not only at the first radio fix in advance of the airplane but also at the second fix in advance of the airplane. It is readily seen that if both of the approach relays, such as B2—ALRP and B2—ARP assume their deenergized position that that particular altitude for the fix under consideration will display a normal coded signal for airplanes approaching from the rear at other altitudes. This is readily understood from the fact that back contacts 155 and 156 of these relays B2—ALRP and B2—ARP will apply energy to the radio transmitter WTB coded at the normal rate accomplished by the code wheel BNW. It will be observed that the coding teeth 71 of the code wheel BNW are wider and farther apart than are the coding teeth 70 of the code wheel BPW. In other words, the code wheel BPW transmits a "high" or proceed code, whereas the code wheel BNW transmits a "low" or normal code. It should also be remembered that the traffic condition code is intermittently interrupted long enough to transmit the fix identifying code.

This feature of transmitting a low rate or normal code is indicated for airplane IP3 (Fig. 4A) in that for this airplane, by reason of having almost approached fix A, the pilot thereof can observe the indications emitted by three radio fixes in advance. In other words, this airplane IP3 will observe a proceed signal at fix A as indicated by the dotted line G3 (Fig. 4A), will observe a second green signal as indicated by another dotted line G3 which extends from the radio antenna WDAB at fix B to the airplane IP3 and will observe a normal indication at fix C as conventionally illustrated by the dotted line N3. All of these dotted lines G3 and N3 (Fig. 4A) signify radio beams transmitted from a radio transmitting ground located antenna to a radio receiving scanning antenna SA (see Fig. 3) on the airplane IP3 (Fig. 4A).

We have just pointed out how the airplane IP3 receives a proceed-over-proceed (G/G) indication from fixes B and A, and receives a normal indication from fix C. This normal indication is due to the face that approach control only extends through two radio fixes ahead of an airplane under consideration. In other words, the presence of the approaching plane IP3 causes the normal indications which would normally be transmitted from fixes A and B to be changed to proceed indication (G) on the assumption that favorable traffic conditions exist in advance of this airplane. For both the 3000 foot altitude of fix A (Fig. 4A) and the 3000 foot altitude of fix B (Fig. 4B), it being understood that the airplane IP3 flies at the 3000 foot altitude, the proceed indication is caused to be transmitted through the back contact 252 of the tail repeater relay, such as relays A3—TRP and B2—TRP, respectively.

We should now observe that the airplane 2P2 also receives a clear indication from fix B as conventionally shown by the dotted line G2 connecting the radio transmitter WTB with airplane 2P2 and that this latter clear indication is not transmitted through a back contact 152 of the relay B2—TRP and front contact 254 of relay B2—TE as it would be if there were no airplanes ahead at this altitude (see contact 252 of relay B3—TRP) but is instead transmitted through a partial circuit including the front contact 152 of this relay B2—TRP and the front contacts 151 and 154 of the relays B2—CRP and B2—TE, respectively, in series. Under the condition of traffic as illustrated for altitude 3000 at fix B a proceed indication G3 is transmitted by the mere picking up of the approach relay B3—ALRP whereas for the 2000 foot altitude at fix B not only is one of the approach relays B2—ALRP or B2—ARP changed to its energized condition but the correspondence repeater relay B2—CRP is also caused to assume its energized position. This signifies that the next block in advance of the block for the altitude in which the airplane 2P2 is flying is unoccupied, this by reason of the fact that the tail relays B2—TR and B2—TLR operate in synchronism. If there had been another airplane in the section connecting fixes B and C the radio energy emitted by such airplane in advance and the radio energy transmitted by the airplane IP2 in the second section in advance would obviously have had their code impulses out of correspondence and this would have caused the tail relays B2—TR and B2—TLR to have operated out of synchronism. This would have caused the correspondence relay B2—CR and its repeater relay B2—CRP to have assumed their deenergized position and therefore the fix B could not have displayed a proceed indication for the 2000 foot altitude through the medium of front contact 151 of this latter relay. In fact, such a condition is indicated for altitude 2000 at fix A (Fig. 4A) where the relays A2—TR and A2—TLR operate out of synchronism as is conventionally shown by the contact 138 of relay A2—TR assuming its energized position and contact 137 of the relay A2—TLR assuming its deenergized position. In this latter instance the correspondence relays A2—CR and A2—CRP both assume their deenergized position and in this case the back contact 151 of the relay A2—CRP transmits uncoded energy through the front contact 152 of the relay A2—TRP, whereas at the 2000 foot altitude for fix B (Fig. 4B) proceed conditions are transmitted through the medium of a similar contact 151 assuming its energized position.

Briefly reviewing the six apparatuses illustrated in Figs. 4A, 4B and 4C of the drawings, it should be observed that all of the apparatus at altitude 3000 for fix C assumes its normal condition whereas the apparatus for altitude 3000 fix B, assumes its normal condition except for the fact that the approach relay B3—ALRP assumes its energized position and the apparatus for altitude 3000 fix A is also in its normal condition except for the fact that the approach relay A3—AR is in a coding condition and its repeater relay A3—ARP assumes its energized position continuously. In other words, the apparatus shown for the 5000 foot altitude for fixes A, B and C is in its normal condition except for the approach control relays which assume positions to manifest occupancy of the section to the rear of fix A for this altitude.

Referring now to the apparatuses for altitude 2000 at these fixes A, B and C it will be observed that the apparatus for 2000 foot altitude fix C is in its danger or R condition by erason of the fact that the tail repeater relay C2—TRP assumes its energized position whereas the correspondence relays C2—CR and C2—CRP both assume their deenergized position. At the 2000 foot altitude of fix (Fig. 4B) on the other hand, a clear condition is indicated by reason of the fact that both the tail repeater relay B2—TRP as well as the correspondence repeater relay B2—CRP assume their energized position. This condition is brought about by the fact that the two tail relays B2—TR and B2—TLR operate in synchronism. Referring now to the 2000 foot altitude for fix A it will be observed that in this case the two tail relays A2—TR and A2—TLR do not operate in synchronism as a result of which the correspondence repeater relay A2—CRP is in its deenergized condition and this combination of relay positions results in the display of a danger signal as indicated by the dotted line R2. At fix-altitude C—2000 (Fig. 4C) if there had been an airplane approaching on the crossing route (proposed airplane NP2) to hold contact 164 of relay WEIR to continuously hold open the contact 185 of relay C2—TLRPF would assume its deenergized position to cause the indication at this fix-altitude C—2000 to be a hold indication. If this proposed (shown by dotted lines) airplane NP2 (Fig. 4DX2) were to approach after airplane IP2 entered block B—C it would receive a stop or hold indication as conventionally shown by the dotted line R2 leading to dotted airplane NP2.

*Hold operation.*—As already hereinbefore mentioned and particularly in connection with Fig. 2 of the drawings the pilot of an airplane is instructed never to pass a wayside radio fix or station if such fix displays the stop or hold (R) indication. Since airplanes cannot stop while in flight it is necessary for the pilot to circle in order to remain aloft and at the same time not to pass the next signal in advance. During such circling operation the tail radio energy emitted by his airplane cannot strike the receiving antennae of the fix in the rear as a result of which suitable means is necessary to prevent the first fix in the rear of such airplane from discontinuing its hold manifestion during such circling operation of the airplane under consideration. As already pointed out the relay TE is in accordance with the present invention not an ordinary conventional relay but preferably is a motor operated timing device such as disclosed in the Field application to which reference has been made above and it is this time element device TE that has been provided to perform this signal-at-hold holding function.

There are two kinds of traffic conditions under such circling operation which must be considered. The first (1) of these conditions is the circling of an airplane when there is no other airplane in advance of the circling airplane and the second (2) condition is when there is an airplane in advance, either in the first or the second block in advance, of the circling airplane performing a holding function.

(1) Referring to Fig. 4C of the drawings, to consider the first circling condition assume that there is no other airplane in advance of the airplane IP2 illustrated at the 2000 foot altitude and in the section extending from fix C to fix DX, namely, in the section beyond fix DX. Let us now observe what will happen if the airplane IP2 starts a circling operation to perform a holding function. It will be observed that the apparatus associated with altitude 2000 for fix C is in a condition to display a hold indication R2 to airplanes in the rear flying at the 2000 foot altitude. This hold or R2 indication (see dotted line R2 extending from antenna WDAC) is due to the tail repeater relay C2—TRP assuming its energized position with the relays C2—CR and C2—CRP both assuming their deenergized position and with the line repeater relay C2—TLRPF manifesting favorable traffic conditions in advance including a manifestation that there is no airplane approaching fix DX on the northbound route at altitude 2000. It will be observed that the front contact 174 of the relay C2—CRP is open so that the dropping of the relay C2—TRP causing the momentary dropping of its repeater relay C2—TRPP will cause momentary deenergization of the winding of the time element device TE. It is also readily understood that circling of the airplane IP2 will cause an interruption of the flow of radio energy from the airplane IP2 to the antenna EDAC and that such interruption of radio energy is not followed or overlapped with radio energy received by the receiving antenna of the next fix DX in advance. In other words, both of the relays C2—TR and C2—TLR manifest favorable traffic conditions in advance following a condition where the relay C2—TR manifested the presence of an airplane. In other words, this is not a usual succession of events. It is this unusual succession of relay operation (relay C2—TRPP dropping momentarily while relays C2—CRP and C2—TRP assume their deenergized condition) that causes momentary deenergization of the timing device C2—TE. In other words, circling of the airplane IP2 causes deenergization of the relays C2—TR and C2—TRP in comparatively rapid succession and this causes the momentary opening of front contact 164 of the relay C2—TRPP at a time when the front contacts 145 and 174 of the relays C2—TRP and C2—CRP are open, causing momentary deenergization of the timing device C2—TE. From the pending Field application above referred to, it is readily seen that momentary deenergization of the time element device restores the apparatus to its starting position and it is not until the time for which the apparatus has been adjusted has elapsed following initial re-energization of its winding that the time contacts on the lock relay LR of the timing apparatus of said Field application will return to their normal condition. That is, as proposed, five minutes will elapse before the contacts of relay C2—TE pick up. This time, which may be assumed to be five minutes, is long enough for the airplane to have completed at least one circle of operation and each picking up and dropping of the repeater relays C2—TRP, such energization occurring once between each successive circling operation, will cause momentary deenergization of the timing device so that the timing function must again be started from its zero time position. It should be understood that other time periods than the five minutes just mentioned may be used, if desired.

From this consideration it is readily seen that the circling of an airplane with the next section in advance unoccupied will cause the first waystation in the rear thereof to continue to display a hold or stop signal (R) for at least five minutes in the cab of an airplane approaching in the rear.

(2) Let us now consider the second circling operation and observe how this timing device, such as time element relay A2—TE (Fig. 4A) will be momentarily deenergized when there is an airplane in advance of the circling airplane. Such a condition is present for airplane 2P2 flying at the 2000 foot altitude between fixes A and B by reason of the fact that there is an airplane IP2 in advance thereof and flying at the same altitude. It will be observed that the tail relay A2—TR, which functions to follow the code of the airplane 2P2, is out of synchronism with the line tail repeater relay A2—TLR which follows the code of the second airplane IP2 in advance of fix A. With these relays A2—TR and A2—TLR operating out of synchronism the slow pick-up correspondence relay A2—CR will of course not have an opportunity to assume its energized position even if it is at times momentarily energized. Since the relay A2—TRP manifests an airplane directly in advance of fix A and the relay A2—TLRPF manifests an airplane at the 2000 foot altitude beyond the next section in advance of fix A both of the back contacts 143 of relay A2—TRP and 144 of the relay A2—TLRPF are open as is also the front contact 142 of the relay A2—CRP. The relay A2—TCRP therefore assumes its deenergized position, as shown. If we now assume that the second airplane IP2 in advance of the fix A is radiating radio energy in the ground receiving antennae at both fixes A and B as would be the case if the airplane had not advanced quite as far as indicated in the drawings, it will be observed that the circling operation of the airplane 2P2 will cause the tail relay A2—TR as well as the tail line relay A2—TRL to follow the code of the airplane IP2. When this occurs, namely, when airplane 2P2 starts its circling operation, these relays A2—TR and A2—TLR will start to operate in synchronism and will cause the correspondence relay A2—CR to assume its energized position and open its back contact 172. When this occurs the relays A2—TRPP and A2—TLRPB will of course remain in their energized position. The back contact 172 of the relay A2—CR will of course open before the front contact 142 of the relay A2—CRP closes so that the time element device A2—TE will be deenergized at least during the pick-up time for relay A2—TCRP. Since this time element device A2—TE is very quick to drop and requires about five minutes to pick up it will be assured that this time element device A2—TE remains in its deenergized position and holds its front contact 154 open during a complete circling operation of the airplane 2P2 in spite of the fact that there is another airplane IP2 in advance thereof which prevents deenergization of the tail repeater relay A2—TRP.

It may now be pointed out that with the contact 154 of the time element device assuming its deenergized position only non-traffic-coded radio energy can be transmitted by the radio transmitter WTA at fix A, and therefore the hold indication (R) is maintained.

It would seem desirable to now point out how a signal indication at a particular fix-altitude changes to a proceed signal immediately (relay TE not dropped) when an airplane flying in that altitude vacates the section next in advance of such fix in spite of the fact that a hold signal is continued to be displayed if such airplane were to perform a circling operation; and to also point out how, when such airplane gets out of communicating range, the relay TE does not drop.

Referring to fix-altitude C—2000 (Fig. 4C) it will be observed that the presence of the airplane 1P2 in the section next in advance for this fix altitude causes a hold signal to be displayed through a circuit including front contact 185 of relay C2—TLRPF, front contact 152 of relay C2—TRP, and back contact 151 of relay C2—CRP. As the airplane 1P2 now passes the next fix DX in advance the tail line repeater relay C2—TLR will operate in code fashion in opposed synchronism with tail relay C2—TR so that the circuit for correspondence relay C2—CR is continuously closed. This will cause the correspondence relay C2—CR to pick up and in turn cause picking up of its repeater relay C2—CRP to cause closing of its front contact 142 before the repeater relay C2—TCRP has had an opportunity to drop due to opening of back contact 144 of relay C2—TLRPB. The drop-away period of relay C2—TCRP is slightly longer than the sum of the pick-up times for the relays C2—CR and C2—CRP, so that contact 142 of relay C2—CRP is closed before relay C2—TCRP has had time to drop. The front contact 173 of the relay C2—TCRP therefore remains closed and the time element device TE is not deenergized.

Let us now consider this airplane 1P2 continuing its eastward flight until it gets out of range of the receiver ERC for fix C. Under this condition code following operation of the relay C2—TR stops whereas code following operation of the relay C2—TLR continues. This stopping of code following operation of relay C2—TR obviously causes the correspondence relays C2—CR and C2—CRP to both assume their deenergized position, the repeater relay C2—TRP also assuming its deenergized position after a short delay time. For reasons pointed out hereinbefore the relay C2—TCRP will not be caused to assume its deenergized position because the back contact 143 of the relay C2—TRP will close before the drop away time of the relay C2—TCRP has expired bearing in mind that front contact 142 of the relay C2—CRP is also opened. In this connection it is desired to point out that dropping of the relay C2—TRP will cause momentary dropping of the relay C2—TRPP at a time when front contact 145 of the relay C2—TRP is open but this transpires before front contact 174 of the relay C2—CRP opens (relay C2—CRP is slower dropping than relay C2—TRP) so that the energizing circuit for the time element relay C2—TE remains continuously closed.

*Operation—change of altitude.*—As already pointed out in general with reference to Fig. 1 of the drawings, the system of the present invention has been designed so that the pilot of each airplane by looking upon the screen of his kinescope will see the waystations in advance of him on the screen and coded to manifest traffic conditions in advance for the particular altitude at which he is flying. This is true because the altimeter contact mechanism shown in Figs. 5A, 5B and 5C will tune his radio receiver for the modulating frequency assigned to the particular altitude at which the airplane is flying, as shown by contacts 20 of the altimeter contactor AC (Fig. 3). The pilot is, however, provided with a hand-knob HK (Fig. 3) and a push button PB through the medium of which he make look into another altitude, so to speak, by adjusting this hand-knob HK for such other altitude and by depressing the push button PB. By "look into" is meant—cause his kinescope to display traffic conditions in such other altitude.

Let us now assume that the pilot of airplane 2P4 (Fig. 1) desires to change altitude because of the airplane 1P4 in advance thereof. Let us first assume that he turns his hand-knob HK to the 3 position and depresses his push button PB (Fig. 3). This operation will enable the pilot of the airplane 2P4 to observe an indication G-over-G as shown for altitude 3 at fixes B and A. The pilot will of course know that it is unsafe for him to descend to altitude 3000 because he is informed by this indication G-over-G that there is an airplane in the 3000 foot altitude and in the same section or block in which he is flying.

Let us now assume that the pilot turns his hand-knob HK to the 5 position and then depresses the push button PB. He will then observe an indication of N-over-N signifying that he may ascend to the 5000 foot altitude with safety. This N-over-N indication signifies no airplane at altitude 5000 in the same section nor the section ahead or behind the section in which airplane 2P4 is flying. Let us now assume that he starts to climb with his airplane 2P4 and as he almost reaches altitude 5000 his altimeter contact mechanism AC will manifest the 5000 foot altitude and will not only through the medium of its contact 20 cause his screen S to display traffic conditions in altitude 5000 but will also cause the tail energy emitted by his airplane 2P4 to be modulated to the 5000 foot altitude modulating frequency. While the pilot of airplane 2P4 was making this ascent he would be expected to continue to keep his push button depressed with his hand-knob HK on the 5 position, this by reason of the fact that traffic conditions might change in the 5000 foot altitude while he is making the ascent. If we assume that a change of traffic condition did take place before his altimeter indicated the 5000 foot altitude, the pilot being informed as to the indication displayed by his contact making altimeter, he would of course know that this change in indication from N-over-N to some other indication was due to another airplane if his contact making altimeter has not yet manifested a 5000 foot altitude. Under this condition, a change to danger traffic conditions at altitude 5000, the pilot of airplane 2P4 would again descend to the 4000 foot altitude and he would be assured of safe traffic conditions in the 4000 foot altitude by reason of the holding function performed by the time element device TE. In other words, the holding feature constituting part of the present invention is not only useful for allowing an airplane to circle to perform a holding function but it also enables him to fly into another altitude, where a change in the position of altimeter contact 21 results in a circling performance, and if he finds traffic conditions unfavorable in such other altitude he may return to his original altitude within the time to which the time element relay TE is adjusted.

*Operation at interlocking fix.*—As already pointed out duplicate apparatuses are provided at the automatic crossing fix DX shown in Figs. 4DX1 and 4DX2 of the drawings. The apparatus in Fig. 4DX1 is very similar to that shown for fixes A, B and C and in fact is substantially identical thereto except for the special code wheels provided and the special interlocking relay WEIR and associated circuits provided. Fig. 4DX2 is identical to Fig. 4DX1 except that the receiving antenna DXNR and the transmitting antenna DXST are directed north and south respectively, whereas the receiving antenna DXER and the transmitting antenna DXWT shown in Fig. 4DX1 are directed eastwardly and westwardly respectively.

By reason of the fact that there has been illustrated an airplane IP2 flying from fix C to fix DX at the 2000 foot altitude, the interlocking apparatus shown in Fig. DX has been conditioned by the picking up of the approach relay D2—AR and its repeater relay D2—ARP to manifest an approaching airplane and to condition the interlocking apparatus to display a hold indication for a northbound airplane approaching the fix DX on the crossing route. The airplane NP2 shown in dotted outline in Fig. DX2 is assumed not to be present and as shown it produces no approach control effect. If we however assume it present we must assume it approached later than did airplane IP2 (Fig. DX1) for if we assume that airplane NP2 produces approach control resulting in the picking up of relay X2—AR we can readily see that danger or hold (R) traffic conditions will be indicated to airplane NP2. As shown the interlocking relay WEIR is stuck up through a stick circuit including the front contact 170 of the approach repeater relay D2—ARP and with this interlocking relay WEIR energized and its front contact 185 closed a proceed indication is displayed for the eastbound airplane IP2 approaching fix DX through a circuit which may be traced from the (+) terminal of the battery DXB1, wire 66, brush 67, slip-ring 68, code wheel DXPW, contact brush 65 associated therewith, bus 92, front contact 154 of relay D2—TE, back contact 152 of the relay D2—TRP, front contact 185 of the interlocking relay WEIR, front contact 153 of the approach repeating relay D2—ARP, wire 150, modulating frequency generator unit F2 of the modulating frequency generator FG to the radio transmitter WTD. This radio energy will of course inform the eastbound approaching airplane IP2 that it is safe to fly over the crossing fix DX.

Referring now to Fig. 4DX2 it will be observed that only uncoded radio energy may be transmitted by the transmitter STX. This is true by reason of the fact that the front contact 385 of the interlocking relay SNIR is open and prevents all coded energy from reaching the radio transmitter STX.

Let us for a moment assume that there is no airplane IP2 approaching on the eastbound airroute and that for this reason all of the contacts 165, 169, 166 and 170 of the approach relays D2—ALRP and D2—ARP assume their deenergized positions. Under this condition the approach relay WEIR can only be maintained in its energized position through the medium of its pick-up circuit including the back contacts 175, 176 and 177 of the relays X2—ARP, X2—ALRP and SNIR, respectively. That is, an interlocking preference once set up will remain effective until an airplane approaches on the stopped route while there is no airplane approaching on the route to which the interlocking relays last gave the right-of-way.

Should now a northbound airplane approach the crossing fix DX it would cause either or both of the approach relays X2—ALRP or X2—ARP to assume an energized position. This might for instance be the airplane NP2 shown in dotted outline. If this should occur the pick-up circuit for the relay WEIR would be broken at one or both of the back contacts 175 and 176 of relays X2—ALRP and X2—ARP and this relay WEIR would by dropping close its back contact 167 and cause the interlocking relay SNIR to be picked up. This latter relay SNIR would then be stuck up through a stick circuit including one or both of the front contacts 179 and/or 180 of the relays X2—ALRP and X2—ARP respectively. It is thus seen that under normal conditions, with no airplanes approaching on either of the two routes, one of the two interlocking relays WEIR or SNIR will assume its energized position and that irrespective of which relay assumes its energized position the approach of an airplane on one airroute only will cause the relay associated with that route to be picked up, if it is not already up, and will cause the other interlocking relay to assume its deenergized position if it was up at that time. Under no-airplane-approaching traffic conditions the interlocking relay for the route which last had an airplane fly over the crossing for that altitude will assume its energized position. Similar interlocking relays are provided for other altitudes.

Not only does an approaching airplane on one route cause a hold indication to be displayed on the other route at the common fix but it also causes a hold indication to be displayed at the next fix in the rear of the common fix of such other route. This control to the next waystation in the rear from a common fix is accomplished through the medium of the front contact, such as front contact 164 of the interlocking relay WEIR for the eastbound route and by a contact, such as the front contact 364 of the interlocking relay SNIR for the northbound route in combination with the contact 185 at the approach fix. Referring to the southeast route it will be observed that the opening of the front contact 164 of the relay WEIR will cause deenergization of the tail repeater relay C2—TLR (Fig. 4C) thereby causing deenergization of its repeater relay C2—TLRPF. The dropping of this latter relay by the opening of its front contact 185 will cause the apparatus at fix C for altitude 2000 to display a stop or hold (R) indication if there is an airplane approaching this fix C to render the approach control for this altitude-fix effective. In other words, not only does an approaching northbound airplane approaching the crossing fix DX cause the display of a hold indication for the corresponding altitude on the eastbound route but such hold indication is also displayed for altitude 2000 at fix C.

*Résumé.*—The airplane cab signalling system of the present invention thus provides means for manifesting the presence of an airplane flying at a particular altitude and in a particular block in spite of the fact that the rearwardly radiated radio energy may reach not only the receiver of the fix immediately in the rear but may also reach the receiver at the second fix in the rear. Stating it briefly, if radio energy, coded in accordance with the code identification of a particular airplane, reaches the radio receivers at two adjacent fixes the circuits and apparatus are so constructed as to manifest an airplane in the forward block and so as not to manifest the presence of an airplane in the block in the rear of such forward block. This function of manifesting at the fix whether an airplane which activates the receiver at such fix is in the block directly in advance of that fix or is in the second block in advance of that fix is accomplished by correspondence contacts 137 and 138 of relays TLR and TR respectively together with a correspondence relay CR controlled by these contacts.

Time delay apparatus has been provided to hold the signal indication for a fix in the rear of an airplane at stop or hold (R) if an airplane flies out of a particular block altitude without entering the same altitude of the block in advance. That is, this hold feature functions in exactly the same manner irrespective of whether a particular airplane performs a circling operation within the same altitude at which it has been flying or whether this airplane ascends or descends into a different altitude in that block. It should also be understood that the circling function just mentioned will properly hold the next signal in the rear of the airplane at stop for a long time interval not only when such circling operation takes place while the next block in advance is unoccupied but will also perform this function if the block in advance is occupied at the same altitude by another airplane. That is, it is the leaving of an airplane from a particular block-altitude without simultaneously therewith entering the block in advance at the same altitude that causes the time delayed hold indication to be maintained.

Suitable interlocking apparatus has been provided to prevent airplanes, flying in the same altitude strata on different routes having a common fix, to cross such fix at the same time. This apparatus not only causes a signal to be displayed to the pilot of the airplane of the crossing route at the crossing fix but also causes a hold indication to be displayed for the same altitude at the approach fix of such crossing route.

Although apparatus for the two different altitudes only has been illustrated in each of Figs. 4A, 4B and 4C and although apparatus for one altitude only has been illustrated for the fix DX of Figs. 4DX1 and 4DX2 it should be understood that similar apparatus is provided for each altitude except that the modulating frequency generators and the filters employed are each designed to generate or filter out the modulating frequency assigned to that altitude. Obviously, the airplane apparatus illustrated in Fig. 3 will include the necessary modulating frequency generating apparatus and filtering apparatus to take care of the number of altitudes for which provision is to be made in practicing the invention.

In the airplane cab signalling system just described the approach control apparatus, including line relays AR and ALRP, is of the normally open circuit type. That is under normal conditions (no airplane approaching) these relays are deenergized. It is of course understood that the control contacts in these approach control circuits may be so organized that these circuits are broken under the conditions that they are now closed. Also, the contacts operated by these relays may be turned up-side down, that is, may be so organized in the circuits they control that they perform the same function upon dropping that they now perform upon picking up. If these changes are made these approach circuits will function on the normally closed circuit principle a principle that should be resorted to when a circuit is to function on the side of safety upon a circuit failure. Since approach control is vital to safety these approach control circuits are preferably constructed on the normally closed circuit principle.

*Modification—Fig. 6.*—In the system hereinbefore described and particularly the wayside apparatus as illustrated in Figs. 4A—4DX of the drawings, the approach control apparatus including approach control relays AR and ALRP dominate not only a proceed (G) indication but also a hold (R) indication. By dominated is meant that even though traffic conditions are potentially otherwise than normal a normal traffic manifestation is manifested unless the approach control is rendered effective due to the approach of an airplane. It is believed that this approach control should preferably be effective to dominate a proceed (G) indication only and not dominate a hold (R) indication. By this is meant that if a particular fix is a danger fix because there is, for instance, an airplane in the block immediately in advance thereof (assuming a particular altitude only) this danger manifestation should prevail irrespective of whether there is an airplane approaching from the rear or not so that the danger indication is present and the failure of approach control apparatus to function cannot extinguish it. In Fig. 6 of the drawings has been illustrated a portion of the apparatus for one fix-altitude of the system shown in Figs. 4A-4DX modified to carry out the type of approach control just mentioned, namely, an approach control which can change a proceed (G) indication to normal (N) but which cannot change a hold (R) indication to normal (N). By referring to altitude 2000 fix A (Fig. 4A) it will be observed that the normal (N) indication for that fix altitude is carried through back contracts 155 and 156 of the relays ALRP and ARP, respectively, in series so that at least one of these relays ALRP or ARP must be up to remove the normal indication. Also all other indications (R or G) are carried through front contacts 155 or 153 of these approach relays. This has been changed in the form of the invention illustrated in Fig. 6 in that although the circuit for producing a normal (N) or low rate flash signal includes the back contacts 155 and 156 of the relays ALRP and ARP, respectively, in series this circuit may not only be broken by these back contacts 155 and 156 as is the case for altitude 2 fix A (Fig. 4A), but may also be broken at either front contact 204 of time element relay TE or at back contact 202 of tail repeater relay TRP. At other times the normal indicating circuit may include front contact 201 of relay CRP in series with front contact 202 of relay TRP. This condition prevails whene there is an airplane in the second block in advance of the fix but there is no airplane in the first block in advance. Under this condition the relay TRP is energized by tail radiation from the airplane in the second block in advance of the fix and this tail radiation being in synchronism with radiation detected at the first fix in the rear of the airplane. This synchronous operation of relays TR and TLR (Fig. 4A) causes the correspondence repeater relay CRP to assume its energized position. In otherwords, this latter traffic condition is a potential clear (G) traffic condition brought about by an airplane in the second block in advance of the fix under consideration. In other words, the contacts 201, 202 and 204 just mentioned correspond to the contacts 151, 152 and 154 of the system illustrated in Figs. 4A-4DX. These contacts 151, 152 and 154 are again duplicated in the form of contacts 211, 212 and 214, these latter contacts being used to transmit a hold indication through the medium of wire 215 directly connected to the wire 150 (no approach contacts included), which wire leads to the transmitter for that fix. In view of the fact that back contacts 211 of relay CRP and 214 of relay TE perform the function heretofore performed by back contacts 154 of relay TE and back contact 151 of relay CRP (Fig. 4A) these latter back contacts 154 and 151 have been omitted from Fig. 6 of the drawings. All of the added wires and added contacts in Fig. 6 of the drawings, which constitute the modification, have been shown by heavy lines so that the manner in which the form of the invention illustrated in Fig. 6 departs from the invention illustrated in Figs. 4A-4DX is clearly indicated. As already stated the back contacts 154 of relay TE and 151 of relay CRP have been omitted from Fig. 6 in that their functions are performed by back contacts 214 and 211 of these respective relays.

It is thus seen that a proceed (G) indication which requires current to flow through the coding wheel APW, bus wire 92, front contact 154 of relay T and back contact 152 of relay TRP must also flow through one or the other of front contacts 153 of approach relay ARP or 155 of approach relay ALRP before it can reach the transmitter through wire 150, whereas a hold indication (R) which is derived from the coding wheel ARW and flows through bus wire 90, and back contact 214 of relay TE, or through back contact 211 of relay CRP and front contact 212 of the relay TRP in series, can flow directly through wire 215 to the wire 150 leading to the transmitter without passing through front contacts of the approach relays. In other words, the approach relays ALRP and ARP cannot under any conditions prevent a hold (R) indication being manifested through the medium of the transmitter fed by wire 150 whereas a proceed (G) indication may be held off and a normal (N) indication may be substituted therefor through the medium of these approach relays ALRP and ARP.

*Fig. 6 operation.*—The modified ground located apparatus, of which only the manner in which it distinguishes from the ground located apparatus shown in Figs. 4A-4DX has been illustrated in Fig. 6, operates in exactly the same way as the apparatus shown in Figs. 4A-4DX insofar as route flying in a particular altitude is concerned when the system functions properly. This is true because if the approach control apparatus shown in Figs. 4A-4DX and in Fig. 6 operate properly the first two signal indications in advance of an airplane will be the same in both systems. Should, however, the approach control apparatus of both systems fail to operate, then the system illustrated in Fig. 6 would produce a hold indication for each fix at which hold (R) conditions exist whereas in the system illustrated in Figs. 4A-4DX a normal (N) indication would be manifested in spite of the fact that hold (R) traffic conditions exist.

Referring now to Fig. 1 of the drawings, it will be remembered that if a pilot desires to change altitude and in order to do so operates his manually operable knob HK to the altitude position into which he wants to look through the medium of his cathode-ray tube including screen S, his rules under the system illustrated in Figs. 4A-4DX would not allow him to make an ascent or descent into such new altitude unless he observed normal (N) indications at both the first fix and the second fix in advance of the airplane. If ground located apparatus modified as illustrated in Fig. 6 is employed the pilot will be instructed to the effect that he may make such change of altitude provided the first fix in advance of his airplane in such proposed altitude manifests normal (N) traffic conditions. The pilot is, however, cautioned that if the second fix in advance of the airplane manifests danger (R) traffic conditions he must be cautious in entering the new altitude so as to be sure to enter such altitude before catching up, so to speak, with the airplane producing such hold (R) indication. In all other respects applicants' system, if modified as illustrated in Fig. 6, functions the same as the system illustrated in Figs. 4A-4DX of the drawings, and no further description of the operation of the modified system is deemed necessary.

The applicants have thus disclosed several cab signalling systems in which the same wayside stations or fixes cause the display of traffic conditions in a plurality of airplanes flying at different altitudes each distinctive of traffic conditions in advance in the particular altitude at which such particular airplane is flying through the medium of means including radio transmitting apparatus for transmitting radio energy from airplanes to wayside fixes in the rear and from ground radio stations or fixes to airplanes in the rear. In order to illustrate applicants' invention, which may take many distinctive forms, two specific embodiments only of the invention have been illustrated, and it should be understood that various changes, modifications, and additions may be made to adapt the invention to the particular problem encountered in practicing the invention without departing from the spirit or scope of the invention except as demanded by the scope of the following claims.

What we claim as new is:

1. In an airway traffic route signalling system, the combination with an airway traffic route consisting of at least one rearwardly directed radio energy emitting ground station and having associated therewith forwardly directed radio receiving ground apparatus, a plurality of airplane carried radio stations each including forwardly directed radio receiving apparatus and rearwardly directed radio transmitting apparatus, and means for interconnecting such radio energy emitting ground station with its associated radio receiving ground apparatus so as to cause such radio energy emitting ground station to emit a distinctive radio signal of restrictive significance to an airplane carried radio station in the rear when such associated radio receiving ground apparatus is activated by a forwardly located receding airplane carried radio station.

2. In an airway traffic route signalling system, the combination with an airway traffic route for movement of airplanes in a particular direction consisting of a plurality of rearwardly directed radio energy emitting ground stations each having associated therewith forwardly directed radio receiving ground apparatus, an airplane carried radio station including forwardly directed radio receiving apparatus and rearwardly directed radio transmitting apparatus, means for interconnecting each radio energy emitting ground station with its associated radio receiving ground apparatus so as to cause such radio energy emitting ground station to emit a distinctive radio signal of restrictive significance to an airplane carried radio station in the rear when such associated radio receiving ground apparatus is activated by a forwardly located receding airplane carried radio station, and means on each airplane including an altimeter to cause the radio signal emitted by its transmitting apparatus and the radio signal permitted to be received by its radio receiving apparatus to be characteristic of the altitude at which such airplane is flying.

3. In an airway traffic route signalling system, the combination with a first airway traffic route consisting of a plurality of rearwardly directed wave energy emitting ground stations each having associated therewith forwardly directed wave energy receiving apparatus, a second airway traffic route crossing said first airway route and also consisting of a plurality of rearwardly directed wave energy emitting ground stations each having associated therewith forwardly directed wave energy receiving apparatuses of which one ground station is common to both routes, a plurality of airplane carried wave energy emitting stations each including forwardly directed wave energy receiving apparatus and rearwardly directed wave energy transmitting apparatus, means for interconnecting the wave energy emitting portion on the ground for each route of the common station with the radio receiving apparatus portion on the ground of the other route so as to cause the wave energy emitting portion for one route of the common station to emit restrictive wave energy to an airplane carried receiving apparatus approaching on the other route when the wave energy receiving apparatus at a ground station in the rear of an airplane approaching the common station on such one route is activated by such airplane carried apparatus on such approaching airplane, and means effective when restrictive wave energy is emitted at the common station in a direction against traffic on one route due to an approaching airplane on the other route to cause the emission of such restrictive energy at the next station in the rear on such one route.

4. In an airway traffic route signalling system, the combination with a first airway traffic route consisting of a plurality or rearwardly directed radio energy emitting ground stations each having associated therewith forwardly directed radio energy receiving apparatus, a second airway traffic route crossing said first airway route and also consisting of a plurality of rearwardly directed radio energy emitting ground stations each having associated therewith forwardly directed radio energy receiving apparatuses of which one ground station is common to both routes, a plurality of airplane carried radio stations each including forwardly directed radio energy receiving scanning apparatus and rearwardly directed radio energy transmitting apparatus, a kinescope controlled by said scanning apparatus for pictorially illustrating the disposition of radio emitting stations in advance of such airplane, and means on the ground for interconnecting the radio energy emitting portion for each route of the common station with the radio receiving apparatus portion of the other route so as to cause the radio energy emitting portion for one route of the common station to emit restrictive radio energy to an airplane carried radio station approaching on the other route when the radio receiving apparatus at a ground station in the rear of an airplane approaching the common station on such one route is activated by such airplane carried apparatus on such approaching airplane.

5. In an airway traffic route signalling system, the combination with a first airway traffic route consisting of a plurality of rearwardly directed wave energy emitting ground stations each having associated therewith forwardly directed wave energy receiving apparatus, a second airway traffic route crossing said first airway route and also consisting of a plurality of rearwardly directed wave energy emitting ground stations each having associated therewith forwardly directed wave energy receiving apparatuses of which one ground station is common to both routes, a plurality of airplane carried wave energy stations each including forwardly directed wave energy receiving apparatus and rearwardly directed wave energy transmitting apparatus, means on the ground for interconnecting the wave energy emitting portion for each route of the common station with the wave energy receiving apparatus portion of the other route so as to cause the wave energy emitting portion for one route of the common station to emit restrictive wave energy to an airplane carried receiving apparatus approaching on the other route when the wave energy receiving apparatus at a ground station in the rear of an airplane approaching the common station on such one route is activated by such airplane carried apparatus on such approaching airplane, and means for superimposing upon such restrictive wave energy characteristic waves to identify the common station.

6. In an airway traffic route defining and traffic condition signalling system; the combination with an airway traffic route consisting of a plurality of rearwardly directed radio energy emitting ground stations each having associated therewith forwardly directed radio receiving apparatus; an airplane carried radio station including a scanning antenna forwardly directed to scan the earth's surface ahead of the carrier airplane; a kinescope controlled from said scanning antenna for pictorially displaying in perspective the radio emitting stations in advance of the airplane within radio communicating distance and a rearwardly directed radio energy emitting apparatus; means associated with each ground station for causing its radio energy emitting apparatus to emit radio energy characteristic of that station and also characteristic of traffic conditions in advance as determined by radio energy received from rearwardly directed radio energy emitted by apparatuses on airplanes in advance, which characteristic energy may be visually interpreted by the pilot through the medium of said kinescope, whereby the pilot may observe on said kinescope the route defined by said ground stations, distinguish these ground stations from each other and be informed as to traffic conditions in advance under all atmospheric and weather conditions.

7. In an airway traffic route defining and traffic condition signalling system; the combination with an airway traffic route consisting of a plurality of rearwardly directed radio energy emitting ground stations each having associated therewith forwardly directed radio receiving apparatus; an airplane carried radio station including a scanning antenna forwardly directed to scan the earth's surface ahead of the carrier airplane; a kinescope controlled from said scanning antenna for pictorially displaying in perspective the radio emitting stations in advance of the airplane within radio communicating distance and a rearwardly directed radio energy emitting apparatus emitting radio energy characteristic of that airplane; means associated with each ground station for causing its radio energy emitting apparatus to emit radio energy characteristic of that station, characteristic of the airplane approaching that station between it and the next station in the rear and also characteristic of traffic conditions in advance as determined by radio energy received from rearwardly directed radio energy emitted by apparatuses on airplanes in advance which characteristic energy may be visually interpreted by the pilot through the medium of said kinescope; whereby the pilot is informed as to the route defined by said ground stations, may distinguish these ground stations from each other and is informed as to traffic conditions in advance under all atmospheric and weather conditions and is also informed as to the operativeness of his airplane carried radio energy emitting apparatus.

8. In an airway traffic route defining and traffic condition signalling system; the combination with an airway traffic route consisting of a plurality of rearwardly directed radio energy emitting ground stations each having associated therewith forwardly directed radio receiving apparatus; an airplane carried radio station including a scanning antenna forwardly directed to scan the earth's surface ahead of the carrier airplane; a kinescope controlled from said scanning antenna for pictorially displaying in perspective the radio emitting stations in advance of the airplane within radio communicating distance and a rearwardly directed radio energy emitting apparatus emitting radio energy characteristic of the altitude at which the airplane is flying; means associated with each ground station for causing its radio energy emitting apparatus to emit radio energy characteristic of that station and also characteristic of traffic conditions in advance for that altitude as determined by radio energy received from rearwardly directed radio energy emitted by apparatuses on airplanes in advance flying at that altitude which characteristic energy may be visually interpreted by the pilot through the medium of said kinescope, whereby the pilot may observe the route defined by said ground stations, distinguish these ground stations from each other and be informed as to traffic conditions in advance at that altitude under all atmospheric and weather conditions.

9. In an airway traffic route signalling system, the combination with an airway traffic route consisting of a plurality of rearwardly directed wave energy emitting ground stations each having associated therewith forwardly directed wave energy receiving ground apparatus, a plurality of airplane carried wave energy stations each including forwardly directed wave energy receiving apparatus and rearwardly directed wave energy transmitting apparatus; an altimeter operated contact mechanism for each airplane carried wave energy station for making connections to cause the wave energy emitted by its wave energy transmitting apparatus to emit wave energy characteristic of the altitude at which such airplane is traveling and to allow only the reception of wave energy by its wave energy receiving apparatus characteristic of that altitude; and means for interconnecting such wave energy emitting ground station with its associated wave energy receiving ground apparatus so as to cause such wave energy emitting ground station to emit a signal of wave energy having a restrictive significance to an airplane carried wave energy receiving apparatus in the rear when the associated wave energy receiving ground apparatus is activated by a forwardly located receiving airplane carried wave energy transmitting apparatus, such signal of wave energy emitted by the wave energy emitting ground station also being characteristic of the altitude at which such receding airplane is flying.

10. In an airway traffic route signalling system; the combination with an airway traffic route consisting of a plurality of rearwardly directed wave energy emitting ground stations each having associated therewith forwardly directed wave energy receiving ground apparatus; a plurality of airplane carried wave energy stations each including forwardly directed wave energy receiving apparatus and rearwardly directed wave energy transmitting apparatus; an altimeter operated contact mechanism for each airplane carried wave energy station for making connections to cause its wave energy transmitting apparatus to emit wave energy characteristic of the altitude at which such airplane is traveling and to allow only the reception of wave energy by its wave energy receiving apparatus characteristic of that altitude; manually operated mechanism to allow the airplane carried receiving apparatus to receive wave energy characteristic of an altitude other than the altitude at which such airplane is flying without changing the characteristic of the wave energy emitted by the wave energy transmitting apparatus carried by that airplane; and means for interconnecting such wave energy emitting ground station with its associated ground wave energy receiving ground apparatus so as to cause such wave energy ground station to emit a signal of wave energy having a restrictive significance to an airplane carried wave energy receiving apparatus in the rear when the associated wave energy receiving ground apparatus is activated by a forwardly located receding airplane carried wave energy transmitting apparatus, such emitted signal of wave energy also being characteristic of the altitude at which such receding airplane is flying, whereby the pilot of an airplane so equipped may by operating his manually operated mechanism observe traffic conditions in altitude lanes other than the particular altitude lane in which his airplane is flying at the time.

11. In an airway traffic route signalling system, the combination with an airway traffic route consisting of a plurality of rearwardly directed radio emitting ground stations each having associated therewith forwardly directed radio receiving ground apparatus, a plurality of airplane carried radio stations each including forwardly directed radio receiving apparatus including a scanning antenna means and a kinescope controlled thereby for pictorially displaying the locations of ground radio transmitters in advance of an airplane and also including rearwardly directed radio transmitting apparatus; an altimeter operated contact mechanism for each airplane carried station for making connections to cause the radio energy emitted by its radio transmitting apparatus to be characteristic of the altitude at which such airplane is traveling and to allow only the reception of radio energy by its radio receiving apparatus characteristic of that altitude; and means for interconnecting such radio energy emitting ground station with its associated radio receiving ground apparatus so as to cause such radio ground station to emit a signal of wave energy having restrictive significance to an airplane carried radio receiving apparatus in the rear when the associated radio receiving ground apparatus is activated by a forwardly located receding airplane carried radio emitting apparatus, such last mentioned signal of emitted radio energy also being characteristic of the altitude at which such receding airplane is flying.

12. In an airway traffic route signalling system, the combination with a first airway traffic route consisting of a plurality of rearwardly directed wave energy emitting ground stations each having associated therewith forwardly directed wave energy receiving ground apparatus, a second airway traffic route crossing said first airway route and also consisting of a plurality of rearwardly directed wave energy emitting ground stations each having associated therewith forwardly directed wave energy receiving ground apparatus, each of said routes having one of its emitting stations at a common location adjacent the intersection of said routes, a plurality of airplane carried wave energy stations each including forwardly directed wave energy receiving apparatus and rearwardly directed wave energy transmitting apparatus and provided with altimeter controlled contact mechanism for causing only the transmission of wave energy and allowing only the reception of wave energy characteristic of the altitude at which such airplane is flying, and means on the ground for interconnecting the wave energy emitting portion for each route with the ground wave receiving apparatus portion of the other route so as to cause the wave energy emitting portion for one route at the common location to emit restrictive wave energy to an airplane carried wave energy station approaching on the other route when the wave energy receiving apparatus at a ground station in the rear of an airplane approaching the intersection on such one route is activated by such airplane carried wave energy transmitting apparatus on such approaching airplane, the wave energy so emitted at the common location for said one route also being characteristic of the altitude at which the airplane approaching the intersection is flying.

13. In an airway traffic route signalling system, the combination with a first airway traffic route consisting of a plurality of rearwardly directed radio energy emitting ground stations each having associated therewith forwardly directed radio receiving ground apparatus, a second airway traffic route crossing said first airway route and also consisting of a plurality of rearwardly directed radio energy emitting ground stations each having associated therewith forwardly directed radio receiving ground apparatus, each of said routes having one of its emitting stations at a common location adjacent the intersection of said routes, a plurality of airplane carried radio stations each including forwardly directed radio receiving apparatus and rearwardly directed radio transmitting apparatus and including altimeter controlled contact mechanism and airplane identifying coding mechanism for causing only the transmission of radio energy characteristic of the airplane and characteristic of the altitude at which the airplane is flying and allowing only the reception of radio energy characteristic of the altitude at which such airplane is flying, and means for interconnecting the radio energy emitting ground portion for each route with the radio receiving ground apparatus portion of the other route so as to cause the radio energy emitting ground portion for one route at the common location to emit restrictive radio energy to an airplane carried radio station approaching on that route when the radio receiving ground apparatus at a station in the rear of an airplane approaching the intersection on the other route is activated by such airplane carried radio transmitting apparatus on such approaching airplane, the radio energy so emitted at the common location for said one route also being characteristic of the altitude at which the airplane approaching the intersection is flying.

14. In an airway traffic route signalling system, the combination with a first airway traffic route consisting of a plurality of rearwardly directed wave energy emitting ground stations each having associated therewith forwardly directed ground wave energy receiving ground apparatus, a second airway traffic route crossing said first airway route and also consisting of a plurality of rearwardly directed wave energy emitting ground stations each having associated therewith forwardly directed wave energy receiving ground apparatus, each of said routes having one of its emitting stations at a common location adjacent the intersection of said routes, a plurality of airplane carried wave energy stations each including forwardly directed wave energy receiving apparatus and rearwardly directed wave energy transmitting apparatus and an altimeter controlled contact mechanism for causing only the transmission of wave energy and allowing only the reception of wave energy characteristic of the altitude at which such airplane is flying, manually controlled means allowing the reception of wave energy characteristic of an altitude other than the altitude at which the airplane is then flying, whereby the pilot may be informed as to traffic conditions in advance in other altitudes than the altitude in which he is flying, and means for interconnecting the wave energy emitting ground portion for each route with the wave receiving ground apparatus portion of the other route so as to cause the wave energy emitting ground portion for one route at the common location to emit restrictive wave energy to an airplane carried wave energy station approaching on said one route when the wave energy receiving ground apparatus at a station in the rear of an airplane approaching the intersection on the other route is activated by such airplane carried wave energy transmitting apparatus on such approaching airplane, the wave energy so emitted at the common location for said one route also being characteristic of the altitude at which the airplane approaching the intersection is flying, whereby the pilot is informed as to traffic conditions at various altitudes at the intersection.

15. In an airplane signalling system, the combination with an air route defined by successive radio transmitting ground stations, means on an airplane and means associated with a radio transmitting ground station to the rear of such airplane cooperating to cause emission of a signal of radio energy rearwardly from such station for manifesting occupancy of the route in advance of such station, and forwardly directed radio receiving apparatus on each airplane responsive to said signals for manifesting on the airplane the condition of occupancy of the route in advance.

16. In an airplane signalling system, the combination with an air route defined by successive radio transmitting ground stations, means on an airplane and means associated with a first radio transmitting ground station to the rear of such airplane for cooperating to omit a particular signal of radio energy rearwardly from such station for manifesting occupancy of the route only if the route is occupied between said first station and the next station in advance, and forwardly directed radio receiving apparatus on another airplane for responding to said particular signal for manifesting on the airplane such condition of occupancy.

17. In an airway traffic route signalling system the combination with an airway traffic route consisting of a plurality of rearwardly directed radio energy emitting ground stations each having associated therewith forwardly directed radio energy receiving ground apparatus, a plurality of airplane carried radio stations each including forwardly directed radio energy receiving scanning apparatus and rearwardly directed radio energy transmitting apparatus, a kinescope controlled by said scanning apparatus for pictorially illustrating the disposition of radio emitting stations in advance of such airplane the presence and direction of which is detected by said scanning apparatus, and means for interconnecting the radio energy emitting portion of a ground station with the radio receiving apparatus portion thereof to cause the emission of a signal of radio energy having restrictive significance rearwardly by the ground station radio energy emitting portion if the radio receiving portion of such station manifests the presence of an airplane ahead.

18. In an airway traffic route signalling system the combination with an airway traffic route consisting of a plurality of rearwardly directed radio energy emitting ground stations each having associated therewith forwardly directed radio energy receiving ground apparatus, a plurality of airplane carried radio stations each including forwardly directed radio energy receiving scanning apparatus and rearwardly directed radio energy transmitting apparatus, a kinescope controlled by said scanning apparatus for pictorially illustrating the disposition of radio emitting stations in advance of such airplane the presence and direction of which is detected by said scanning apparatus, means for interconnecting the radio energy emitting portion for a ground station with the radio receiving apparatus portion thereof to cause the emission of a signal of radio energy having restrictive significance rearwardly by the ground station radio energy emitting portion if the radio receiving portion of such ground station manifests an airplane ahead, and means at a ground station for maintaining effective such emission of restrictive radio energy if the airplane in advance makes a circling move but not maintaining it effective if the airplane advances and passes the next ground radio station in advance thereof.

19. In an airway traffic route defining and traffic condition signalling system; the combination with an airway traffic route consisting of a plurality of rearwardly directed radio energy emitting ground stations each having associated therewith forwardly directed radio receiving apparatus; an airplane carried radio station including a scanning antenna forwardly directed to scan the earth's surface ahead of the carrier airplane, a kinescope controlled from said scanning antenna for pictorially displaying in perspective the radio energy emitting ground stations in advance of the airplane within radio communicating distance the presence and direction of which is detected by said scanning antenna and a rearwardly directed radio energy emitting apparatus emitting radio energy characteristic of the altitude at which the airplane is flying; and means associated with each ground station for causing its radio energy emitting apparatus to emit distinctive signals of radio energy characteristic of traffic conditions in advance in different altitudes as determined by radio energy received from rearwardly directed radio energy emitting apparatus on airplanes in advance flying in such altitudes.

20. In an airway traffic route defining and traffic condition signalling system; the combination with an airway traffic route consisting of a plurality of rearwardly directed radio energy emitting ground stations each having associated therewith forwardly directed radio receiving apparatus; an airplane carried radio station including a scanning antenna forwardly directed to scan the earth's surface ahead of the airplane, a kinescope controlled from said scanning antenna for pictorially displaying in perspective the radio energy emitting ground stations in advance of the airplane within radio communicating distance, the presence and direction of which is detected by said scanning antenna, and a rearwardly directed radio energy emitting apparatus emitting distinctive radio signals characteristic of the different altitude at which the airplane is flying; means associated with each ground station for causing its radio energy emitting apparatus to emit distinctive radio signals characteristic of traffic conditions in advance in the different altitudes as determined by radio energy received from rearwardly directed radio energy emitting apparatus on airplanes in advance flying in such altitudes; and means effective when the radio signal emitted manifests danger traffic conditions in a given section for maintaining such emission for a limited time if the airplane in such section either makes a circling move or enters a different altitude.

21. In an airway route defining and traffic condition signalling system; the combination with an airway traffic route consisting of a plurality of rearwardly directed radio energy emitting ground stations each having associated therewith forward'y directed radio receiving apparatus; an airplane carried radio station including a scanning antenna forwardly directed to scan the earth's surface ahead of the carrier airplane; a kinescope controlled by said scanning antenna and p'ctorially displaying in perspective the radio emitting stations in advance of the airplane within radio communicating distance and having a rearwardly directed radio energy emitting apparatus; means associated with each ground station for causing its radio energy emitting apparatus to emit normal signals and distinctive signals of radio energy characteristic of traffic conditions in advance as determined by radio energy received if such radio energy is received from an airp'ane flying between that station and the next station in advance but not if it is received at both that station and the next station in advance and which radio energy emitted by such ground station may be visually interpreted by the pilot through the medium of said kinescope to inform him of traffic conditions in dvance, whereby the pilot may observe on said lnescope the route defined by said ground stations and be informed as to traffic conditions in dvance in accordance with the character of the adio energy received and manifested on said lnescope.

22. In combination, a plurality of fixes at successive points along the ground of an airway oute; forwardly directed radio receiving apparatus and rearwardly directed radio transmitting pparatus at each fix; a plurality of airplane carled radio stations each including a rearwardly lrected radio transmitting antenna and a forvardly directed scanning antenna and a kinecope controlled by said scanning antenna; leans for coding the radio energy emitted by ach airplane carried radio transmitting antenna o as to identify its airplane; means partly at each ix and partly at the fix next in the rear for transiitting the airplane code received at such fix o the fix in the rear; and means at each fix ffective to cause such fix to emit radio energy y its transmitting antenna manifesting "proeed" traffic conditions to a scanning antenna n the rear if the same airplane identifying code s transmitted to that fix and is also being reeived at the next fix in advance but to emit adio energy manifesting "hold" when such airlane identifying code is received at such fix but s not received at the fix in advance thereof.

23. In an airway traffic route signalling sysem, the combination with an airway traffic route onsisting of a plurality of fixes each provided vith rearwardly directed radio energy emitting pparatus and forwardly directed radio receivng apparatus, a plurality of airplane carried ralio stations each including forwardly directed adio receiving apparatus and rearwardly diected radio transmitting apparatus, means for nterconnecting the radio energy emitting appaatus and the radio energy receiving apparatus or each fix so that the radio energy emitting pparatus emits a restrictive radio beam to an irplane carried radio station in the rear when he receiving apparatus for that particular fix s activated by transmitting apparatus on a forvardly located airplane, and for emitting proeed radio energy when the block between that ix and the next fix in advance is unoccupied, ind means for changing the proceed radio enrgy to normal radio energy if there is no airlane approaching that fix from the rear.

24. In an airway route signalling system, the ombination with a route along the ground consisting of a plurality of fixes, means at each fix or emitting at least two kinds of signals of radio nergy toward airplanes in the rear, one signal manifesting favorable traffic conditions and the ther signal manifesting unfavorable traffic conlitions, and means for governing the means at each fix in accordance with air traffic conditions n advance.

25. In an airway route signalling system, the combination with a route along the ground consisting of a plurality of fixes, means at each fix for emitting at least two different signals of radio energy toward airplanes in the rear, one signal manifesting favorable traffic conditions and the other signal manifesting unfavorable traffic conditions, means for governing the means at each fix in accordance with air traffic conditions in advance, and means for changing the radio signal manifesting favorable traffic conditions to radio energy manifesting normal traffic conditions when there is no airplane approaching such fix from the rear under favorable traffic conditions in advance.

26. In an airplane cab signalling system of the type described, an air route consisting of a plurality of successive fixes each provided with a radio transmitter, airplanes for flying over that route each provided with radio receiving apparatus, means for manifesting at each fix airplane traffic conditions in advance, and means for controlling each transmitter so as to emit signals of radio energy manifesting such traffic conditions so that such manifestation may, through the medium of a radio receiver on an airplane approaching such fix from the rear, be manifested on such approaching airplane.

27. In an airplane cab signalling system of the type described, an air route consisting of a plurality of successive fixes each provided with a radio transmitter, airplanes for flying over that route each provided with radio receiving apparatus, means for manifesting at each fix airplane traffic conditions distinctively for each altitude, and means for controlling each transmitter so as to emit signals of radio energy manifesting such traffic condition for each altitude so that such manifestation may, through the medium of a radio receiver on an airplane approaching such fix from the rear at a particular altitude, be manifested as to that particular altitude on such approaching airplane.

28. An automatic signal system for airways to give signals in airplanes indicating the presence or absence of another airplane within a limited distance ahead at the same altitude comprising in combination, a plurality of spaced ground stations along an airway each equipped with radio transmitting and receiving apparatus, said ground station radio transmitting apparatus acting to transmit signals distinctively relating to different altitudes for airplane movement along the airway and having different characters for each altitude to indicate the presence or absence of an airplane, equipment on each airplane including an altimeter and radio transmitting and receiving apparatus cooperating respectively with the receiving and transmitting apparatus of successive ground stations as said airplane flies along the airway, said altimeter acting to render the radio receiving apparatus on the airplane responsive to the particular radio signal from an adjacent ground station relating to the altitude at which that airplane is then flying, and means including a system of communication between said ground stations for governing the character of the signals transmitted from a given ground station for the respective altitudes in accordance with the presence of airplanes adjacent thereto in corresponding altitudes, whereby an airplane in a given altitude along the airway will manifest its presence by acting upon the equipment of an adjacent ground station and the transmitting apparatus at a ground station will be controlled over the communication system to send out a signal for any airplane adjacent thereto in the same altitude to indicate the presence of the airplane ahead.

29. A system of signalling for airways comprising in combination, equipment at a fixed ground station operable to transmit signals of a radio frequency having a plurality of distinctive characters relating respectively to different altitudes for airplanes flying over said ground station, radio receiving equipment on each of a plurality of airplanes adjustable to respond to a particular selected one of said signals of distinctive character transmitted by the ground station, and means including an altimeter for adjusting the equipment on each airplane to conform with the altitude at which that airplane is then flying and thereby permit its equipment to respond to the signal from the ground station belonging to its altitude.

30. A signalling system for airways comprising in combination, radio transmitting and receiving equipment at each of a plurality of spaced ground stations, equipment on each of a plurality of airplanes including radio transmitting and receiving apparatus cooperating with said radio equipment of the ground stations as the airplane flies over said ground stations, said equipment on each airplane including an altimeter for adjusting its radio transmitting and receiving means to conform with the altitude at which the plane is then flying, said equipment on the airplanes co-operating with the equipment at the ground stations to register automatically at each ground station the presence of an airplane within a limited distance of that ground station and the altitude at which such airplane is then flying, each of said ground stations acting to transmit a radio signal for each altitude distinctive from the signals for all other altitudes and coded to conform with the presence or absence of an airplane in that altitude near that ground station, and manually operable means on each airplane for adjusting its radio receiving apparatus independently of the automatic control thereof by its altimeter to render said apparatus responsive to signals belonging to an altitude either above or below the altitude at which the plane is then flying.

31. A system of signalling for airways comprising in combination, a plurality of spaced ground stations each having radio transmitting equipment operable to transmit a plurality of signals of a distinctive character belonging respectively to a plurality of different altitudes, means associated with said ground station for selectively applying distinctive codes to each of the signals for the different altitudes, radio receiving apparatus on the airplane including an altimeter for rendering said apparatus responsive only to the particular distinctive signal from the ground stations belonging to the altitude at which the airplane is then flying, and means on the airplane for indicating the code applied to the particular signal being received.

32. A signalling system for airways comprising in combination, a plurality of ground stations located at intervals along an airway and each having radio transmitting and receiving apparatus operating on different carrier frequencies, means associated with the transmitting apparatus of each ground station for modulating its carrier frequency with a plurality of distinctive tones relating respectively to different altitudes allotted for the movement of airplanes along the airway, radio transmitting and receiving equipment on each airplane flying over the airway operating on the carrier frequencies of the ground station receiving and transmitting apparatus respectively, means on each airplane including an altimeter for rendering its receiving equipment responsive only to the tone transmitted from any ground station belonging to the altitude at which the airplane is then flying, said means also causing modulation of the carrier frequency being transmitted from the airplane with a particular distinctive altitude tone corresponding with the altitude at which the plane is then flying, said apparatus at the ground stations including separate directional transmitting and receiving antennas directed in opposite directions along the airway, and means associated with each ground station and responsive to the reception by its receiving apparatus of an altitude tone from an airplane for applying a warning code to the tone belonging to that same altitude being transmitted from that ground station, whereby any airplane flying over the airway at a given altitude in a predetermined direction with respect to the directional arrangement of the ground station antennas will transmit a tone corresponding to that altitude to a ground station in the rear of that plane and cause that ground station to transmit a coded warning signal to be received by a following airplane if flying at that same altitude.

33. In a signalling system of the character described for airways, in combination with radio transmitting apparatus on each of a plurality of airplanes having a limited range, a plurality of ground stations spaced at intervals less than the range of said radio transmitting apparatus on the airplanes, and radio receiving apparatus for said ground stations including directional antennas directed in the same direction at which airplanes fly over said ground stations, whereby the action of said radio transmitting apparatus on a given airplane upon the radio receiving apparatus of the ground stations is limited to the ground stations in the rear of that plane within the range of its radio transmitting apparatus.

34. A signalling system for airways comprising in combination, a plurality of ground stations located at intervals along an airway and each having radio transmitting and receiving apparatus operating on different carrier frequencies, separate directional transmitting and receiving antennas for each ground station directed in opposite directions along the airway with respect to an established direction of traffic, and radio transmitting and receiving equipment on each airplane flying in the established direction of traffic along the airway, said transmitting equipment on the airplane operating on the carrier frequency of the receiving apparatus of the ground stations and acting upon the directional receiving antenna of a ground station in the rear but not ahead of that airplane, said receiving equipment on each airplane operating on the carrier frequency of the transmitting apparatus of the ground stations and responding to transmission from the directional transmitting antenna of a ground station ahead but not in the rear of that airplane.

35. In an automatic signalling system for airways, a plurality of spaced ground stations located along an airway, directional radio transmitting and receiving apparatus at each of said ground stations, each said transmitting apparatus acting to transmit its radio signals in one direction and each said receiving apparatus being responsive to radio signals from the opposite direction, and each having radio transmitting and receiving equipment, each transmitting equipment having a range at least as great as the distance between any two ground stations and at times greater, and each plane carried transmitting equipment being effective to transmit a radio signal to the radio receiving apparatus of a ground station to indicate the presence of that plane in advance of such ground station, and control means at each ground station acting upon the reception of a radio signal from a plane for causing the associated radio transmitting apparatus to transmit a radio signal of such a character that its reception by the receiving equipment of another plane indicates on such other plane the presence of the first plane in advance of said ground station receiving the radio signal from said first plane.

36. A signalling system of the character described for airways comprising in combination, a plurality of spaced ground stations each having radio transmitting apparatus operable to transmit a particular coded radio signal, radio receiving apparatus on an airplane responsive to said coded radio signal, radio transmitting apparatus on an airplane and radio receiving apparatus for each ground station cooperating to register at a ground station the presence of a plane within a limited distance of that ground station, a communication system between said ground stations for transmission of controls from one ground station to another, and means governed by the receiving apparatus of a given ground station when registering the presence of an airplane and acting over said communication system to render the radio transmitting apparatus of a ground station ahead effective to transmit said particular coded radio signal, whereby transmission of said radio signal from a ground station is initiated by an approaching airplane and said signal is not received by such airplane unless its presence has been registered at a ground station in the rear.

37. A signalling system of the character described for airways comprising in combination, a plurality of spaced ground stations each having radio transmitting apparatus operable for transmitting a normal radio signal and controllable to transmit a particular coded radio signal, radio transmitting apparatus on an airplane and radio receiving apparatus for each ground station cooperating to register at a ground station the presence of a plane within a limited distance of that ground station, a communication system between said ground stations for transmission of controls from one ground station to another, and control means governed by the receiving apparatus of a given ground station when registering the presence of an airplane for acting over said communication system to control the radio transmitting apparatus of a ground station ahead to change the signal being transmitted by that ground station from said normal coded signal to said particular coded signal, whereby said particular coded radio signal transmitted from a ground station is received by an approaching airplane but is not received by such airplane unless its presence has been registered at a ground station.

38. In an airway signalling system, radio transmitting and receiving apparatus located on the ground at intervals along the airway and relating to different blocks, each block having a radio transmitting equipment and a radio receiving equipment operable on different frequencies, each of said transmitting equipments operating to transmit a normal radio signal but controllable to transmit a particular coded signal, apparatus on each airplane flying over said airway including radio transmitting and receiving apparatus controlled by an altimeter, said apparatus on an airplane cooperating with said transmitting and receiving apparatus on the ground to register an airplane as being in a particular block at a particular altitude, and means including a communication system extending along the airway between the transmitting and the receiving apparatus on the ground for rendering the transmitting apparatus for the block ahead of said particular block in which the presence of an airplane is manifested as being at a particular altitude effective to transmit said particular code instead of said normal radio signal for the corresponding altitude.

39. In an airway signalling system, radio transmitting and receiving equipments located on the ground at intervals along the airway and belonging to different airway blocks, each airway block having its radio transmitting equipment operable on a different frequency from its radio receiving equipment, said transmitting equipment for each block normally operating to transmit a normal radio signal but controllable to transmit different coded signals, apparatus on each airplane traveling over the airway including radio transmitting and receiving apparatus governed by an altimeter for transmitting and receiving radio signals characteristic of the altitude at which the plane is then flying including said normal radio signal, said apparatus cooperating with said radio transmitting and receiving equipments located on the ground to register that airplane as being in a particular block at a particular altitude, and means including a communication system extending between the radio transmitting and receiving equipments located on the ground along the airway for rendering the transmitting equipment for a block in the rear of the particular block in which an airplane is manifested as being present effective to transmit a distinctive radio signal having a restrictive significance for the particular altitude corresponding to the altitude in which the airplane in the block ahead is traveling, said means also acting to render the radio transmitting equipment for the block ahead of the particular occupied block effective to transmit a radio signal different from said normal radio signal but in accordance with traffic conditions in the next succeeding block.

40. In an airway signalling system, radio transmitting and receiving equipments located on the ground at intervals along the airway and relating to different blocks, each block having a radio transmitting equipment and radio receiving equipment operable on different frequencies for the transmission and reception respectively of radio signals, apparatus on each airplane including a radio transmitter, a radio receiver and an altimeter, said apparatus cooperating with said transmitting and receiving equipments on the ground to register an airplane as being in a particular block at a particular altitude, and means including a communication system between the transmitting and receiving equipments along the airway for rendering the transmitting equipment for a given block effective to transmit a distinctive signal having a restrictive significance for a particular altitude when the presence of another airplane at the same altitude is manifested as being in the block ahead by reason of the signal received by the radio receiving equipment for such block ahead.

41. In a system of the character described for providing signal indications on moving airplanes from ground stations along an airway, radio transmitting and receiving apparatus at the ground stations operating on different carrier frequencies for cooperating with radio transmitting and receiving apparatus on airplanes for transmission of radio signals to and from such airplanes and ground stations, code determining means for each ground station operable only when conditioned for such operation to apply any one of a plurality of different and significant codes relating to different conditions of traffic to be communicated to an airplane, means constituting a system of communication for transmission of controls from each ground station to another ground station ahead in the established direction of traffic over the airway, and means at each ground station rendered effective by the reception at that ground station of a signal from an airplane and acting over said communication system to condition said code determining means for a ground station ahead to give a selected one of said significant codes, whereby failure to register at a ground station the presence of a passing airplane may be manifested to the pilot of that airplane because of the failure to receive a significant code signal from a ground station ahead.

42. A signalling system for airways comprising in combination, radio transmitting and receiving equipment at each of a plurality of spaced ground stations, equipment on each of a plurality of airplanes including radio transmitting and receiving apparatus cooperating with said radio equipment of the ground stations as the airplane flies over said ground stations said equipment on each airplane including an altimeter for adjusting its radio transmitting and receiving means to conform with the altitude at which the plane is then flying, said equipment on the airplanes cooperating with the equipment at the ground stations to register automatically at each ground station the presence of a plane within a limited distance of that ground station and the altitude at which such airplane is flying, each of said ground stations acting to transmit a radio signal for each altitude distinctive from the signals for all other altitudes and coded to conform with the presence or absence of an airplane in that altitude near that ground station.

43. A system of signalling for airways comprising in combination, equipment at a fixed ground station operable to transmit signals of a radio frequency having a plurality of distinctive characters relating respectively to different altitudes for airplanes flying over said ground station, radio receiving equipment on each of a plurality of airplanes adjustable to respond to a particular selected one of said signals of distinctive character transmitted by the ground station, means including an altimeter for normally adjusting the equipment on each airplane to conform with the altitude at which that airplane is then flying and thereby permit its equipment to respond to the signal from the ground station belonging to its altitude, and manually operable means on each airplane for adjusting its radio receiving equipment independently of its altitude to render that equipment responsive to the distinctive signal for some altitude above or below the altitude at which the airplane is then flying.

44. In an automatic signal system for airways, a plurality of spaced ground stations located along an airway. a radio transmitting and receiving apparatus at each ground station, communication means inter-connecting successive ground stations, a control means at each ground station for causing its associated radio transmitting apparatus to transmit a given code signal, and plane carried radio transmitting apparatus on one airplane for transmitting a signal to the radio receiving apparatus of any given ground station to indicate its presence for acting over said communication system to cause the control means at the ground station next in advance to transmit a different code signal, whereby some other airplane upon receiving said different code signal is advised of the approach of said one airplane.

45. In an automatic signal system for airways, a plurality of spaced ground stations located along an airway having a plurality of altitudes for airplane travel, a radio transmitting and receiving apparatus at each ground station, communication means interconnecting successive ground stations, control means at each ground station for causing its associated radio transmitting apparatus to transmit a code signal of normal character for each of said altitudes, and plane carried radio transmitting apparatus on a first airplane for transmitting a signal characteristic of its particular altitude to the radio receiving apparatus of any given ground station to indicate its presence in that altitude by acting over said communication system to cause said control means at the next ground station in advance to transmitting a distinctive code signal for said particular altitude without interrupting transmission said code signal of said normal character for all other altitudes, whereby a second airplane traveling at some other altitude upon receiving said distinctive code signal is advised of the approach of said first airplane at said particular altitude.

46. The signalling system for airways comprising in combination, radio transmitting and receiving apparatus for an airplane and for a ground station cooperating to transmit radio signals on different carrier frequencies to and from the airplane and the ground station, means on the airplane for distinctively coding the radio signal transmitted by its transmitting apparatus, means at the ground station responsive to the characteristics of the code being received by its receiving apparatus for applying the same code to the signal being transmitted by the transmitting apparatus of another ground station, means on the airplane responsive to the characteristics of the code being received by its receiving apparatus from a ground station, and means on the airplane automatically indicating if the code being received by its receiving apparatus corresponds with the code being transmitted by its transmitting apparatus.

47. In an airway signalling system, a plurality of spaced ground stations distributed along the airway and each including radio transmitting and receiving apparatus, a plurality of airplanes each having radio transmitting and receiving apparatus, said receiving apparatus including a forwardly directed radio energy receiving scanning apparatus, a kinescope controlled by said scanning apparatus on each airplane for pictorially illustrating the disposition of the radio transmitting apparatus at each of the ground stations in advance of such airplane, the presence and direction of which is detected by said scanning apparatus, means on each airplane including an altimeter for causing its associated radio transmitting apparatus to transmit radio signals characteristic of the altitude at which the airplane is then flying which signals when received by a ground station radio receiving equipment indicates the presence of that plane adjacent to such ground station and at the altitude at which the airplane is then flying, control means associated with said ground stations rendered active by the reception of a radio signal transmitted by a plane from a particular altitude to cause the transmission of a distinctive radio signal of restrictive significance by the next station in the rear which signal is for an altitude corresponding to said particular altitude, and means associated with each ground station for maintaining the transmission of a distinctive radio signal of restrictive significance for any given altitude for a limited time after the airplane in advance climbs or descends into a different altitude.

48. In an airway signalling system, a plurality of spaced ground stations distributed along the airway and each including radio transmitting and receiving apparatus belonging to different blocks, a plurality of airplanes each having radio transmitting and receiving apparatus, means on each airplane including an altimeter for causing its associated radio transmitting apparatus to transmit radio signals characteristic of the altitude at which the airplane is then flying which signals when received by a ground receiving equipment indicate the presence of that plane adjacent to such ground station and at the altitude at which the airplane is then flying, control means associated with said ground stations rendered active by the reception of a radio signal transmitted by a plane from a particular altitude by the radio receiving apparatus for a particular block to cause the transmission of a distinctive radio signal by the radio transmitting apparatus for the block next in the rear which signal is for an altitude corresponding to said particular altitude and is of a restrictive significance, and means associated with each ground station for maintaining the transmission of said distinctive radio signal of restrictive significance for any given altitude for a limited time after the airplane at that altitude in the block in advance climbs or descends into a different altitude.

49. In an airway signalling system, the combination with a first airway for traffic in one direction and a second airway for air traffic in another direction and crossing said first airway, of a plurality of spaced ground stations associated with each of said airways and each comprising forwardly directed radio receiving equipment and rearwardly directed radio transmitting equipment, each of said airways having one of its radio transmitting equipments at a common location adjacent to the intersection of said airways, a plurality of airplanes traveling said airways each having equipment for transmitting and receiving radio signals and including an altitude controlled contact mechanism for causing its associated transmitting and receiving equipment to be effective for transmitting and receiving radio signals characteristic of only the altitude at which the plane is then flying, and control means for governing the transmitting equipment at said common location for one airway for transmitting a distinctive radio signal of restrictive significance for a particular altitude when an airplane is approaching such crossing on the other airway at the same altitude as indicated by the reception of a radio signal at the ground station on said other airway next in the rear of said common location at the crossing.

50. In an air traffic route signalling system, the combination with a first airway traffic route consisting of a plurality of rearwardly directed ground radio emitting stations each having associated therewith forwardly directed ground radio receiving apparatus, a second airway traffic route crossing said first airway route and also consisting of a plurality of rearwardly directed ground radio emitting stations each having associated therewith forwardly directed ground radio receiving apparatus, each of said routes having one of its emitting stations at a common location adjacent the intersection of said routes, a plurality of airplane carried radio stations each including forwardly directed radio receiving apparatus and rearwardly directed radio transmitting apparatus, and means for interconnecting the ground radio emitting station for each route at the common location with the ground radio receiving apparatus position of the other route so as to cause the ground radio emitting station for one route at the common location to emit distinctive radio signals of restrictive significance to an airplane carried radio station approaching on the other route when the ground radio receiving apparatus at some station in the rear of an airplane flying toward said common location on such one route is activated by such airplane carried radio transmitting apparatus on such approaching airplane.

51. In an airway signalling system, the combination with a first airway for traffic in one direction and a second airway for traffic in another direction and crossing said first airway, of a plurality of spaced ground stations associated with each of said airways and each including radio transmitting and receiving equipment, each of said airways having one of its ground stations at a common location adjacent the crossing of said airways, a plurality of airplanes including at least one airplane for each airway each of which is equipped with radio transmitting and receiving apparatus, the transmitting apparatus being effective to transmit radio signals which when received by a ground station receiving equipment indicate the presence of that plane adjacent to such ground station, control means rendered active in response to the reception of an airplane transmitted signal at the ground station next in the rear of said common location on either airway for causing said transmitting equipment for the other airway at said common location to transmit a signal having a danger significance when received by an airplane approaching the crossing on such other airway, and means at said common location acting while said control means is rendered active for either airway to prevent the rendering active of said control means for the other airway to thereby allow the airplane that first approaches the crossing to safely pass while causing an airplane on the other airway to hold.

52. In an airway signalling system, the combination with a first airway for traffic in one direction and a second airway for traffic in another direction and forming an intersection with said first airway, of a plurality of spaced ground stations associated with each of said airways and each including radio transmitting and receiving equipment, each of said airways having one of its ground stations at a common location adjacent to the intersection of said airways, a plurality of airplanes including at least one airplane for each airway each of which is equipped with radio transmitting and receiving apparatus and an altimeter, the transmitting apparatus on each airplane being effective to transmit a radio signal which when received by a ground station receiving equipment indicates the presence of that airplane adjacent to such ground station and at a particular altitude, control means associated with said ground stations and rendered active in response to the reception of an airplane transmitted signal at the ground station next in the rear of said common location on either airway for causing said transmitting equipment for the other airway at said common location to transmit a signal having danger significance for an altitude corresponding to said particular altitude when received by an airplane approaching the intersection on such other airway at that altitude, and means at said common location acting while said control means is active for one airway to prevent its being rendered active for the other airway to thereby give a preference for passing the intersection of airways to the airplane first approaching the intersection.

53. In an airway signalling system, the combination with a first airway for traffic in one direction and a second airway for traffic in another direction and crossing said first airway of a plurality of spaced ground stations associated with each of said airways and each comprising radio transmitting and receiving equipment, each of said airways having one of its ground stations at a common location adjacent the crossing of said airways, communication means connecting successive ground stations of each airway, a plurality of airplanes for said airways each having radio transmitting and receiving equipment, said transmitting equipment of any given airplane acting to transmit a radio signal to the ground station next in the rear to thereby indicate its presence, control means at each ground station responsive to a radio signal by its receiving equipment indicating the presence of an airplane for causing its associated radio transmitting equpment to transmit a distinctive radio signal having a restrictive significance when received by a following plane, said control means also acting over said communication means to render active said transmitting equipment of the station in advance to transmit a distinctive radio signal dependent upon traffic conditions, and means at said common location responsive to control over said communication means for one airway to render the radio transmitting equipment active for that airway and to at the same time render the transmitting equipment at the common station for the other airway active to transmit said distinctive radio signal having a restrictive significance.

OSCAR S. FIELD.
SEDGWICK N. WIGHT.

REFERENCES CITED

The following references are of record in the file of this patent:

UNITED STATES PATENTS

| Number | Name | Date |
| --- | --- | --- |
| 2,062,003 | Hammond | Nov. 24, 1936 |
| 2,204,553 | Smola | June 18, 1940 |
| 2,267,715 | Bowen | Dec. 30, 1941 |
| 2,289,242 | Chance et al. | July 7, 1942 |
| 2,365,949 | Greene | Dec. 26, 1944 |